(12) United States Patent
Suzuki

(10) Patent No.: US 8,330,833 B2
(45) Date of Patent: Dec. 11, 2012

(54) SIGNAL PROCESSING APPARATUS FOR DETERMINING COLOR CONVERSION PROCESSING FOR COLOR-CONVERTING SECOND COLOR SIGNAL OBTAINED BY SECOND IMAGE PICKUP DEVICE TO COLOR SIGNAL APPROXIMATE TO FIRST COLOR SIGNAL OBTAINED BY TARGET FIRST IMAGE PICKUP DEVICE AND NON-TRANSITORY COMPUTER-READABLE RECORDING MEDIUM FOR RECORDING SIGNAL PROCESSING PROGRAM FOR THE COLOR CONVERSION PROCESSING

(75) Inventor: Hiroshi Suzuki, Hachioji (JP)

(73) Assignee: Olympus Corporation (JP)

( * ) Notice: Subject to any disclaimer, the term of this patent is extended or adjusted under 35 U.S.C. 154(b) by 420 days.

(21) Appl. No.: 12/627,505

(22) Filed: Nov. 30, 2009

(65) Prior Publication Data

US 2010/0103278 A1    Apr. 29, 2010

Related U.S. Application Data

(63) Continuation of application No. PCT/JP2008/059185, filed on May 20, 2008.

(30) Foreign Application Priority Data

May 31, 2007  (JP) ................................. 2007-145928

(51) Int. Cl.
*H04N 5/217* (2011.01)
(52) U.S. Cl. ..................................... 348/241; 348/222.1
(58) Field of Classification Search ............... 348/222.1, 348/241, 263; 382/167
See application file for complete search history.

(56) References Cited

U.S. PATENT DOCUMENTS

| 4,679,074 A * | 7/1987 | Sugiura et al. ................ 348/675 |
| 6,864,915 B1 | 3/2005 | Guimaraes et al. |

(Continued)

FOREIGN PATENT DOCUMENTS

EP    2 205 002 A1    7/2010

(Continued)

OTHER PUBLICATIONS

Search Report issued by European Patent Office in connection with corresponding application No. EP 08 75 2981 on Oct. 18, 2010.

(Continued)

*Primary Examiner* — Gevell Selby
(74) *Attorney, Agent, or Firm* — Ostrolenk Faber LLP

(57) ABSTRACT

A signal processing apparatus for determining color conversion for converting a second color signal obtained through image pickup by a second image pickup device to be processed to a color signal approximate to a first color signal obtained through image pickup by a target first image pickup device, including a spectral difference calculating section that calculates a difference between spectral characteristics of the first image pickup device and spectral characteristics of the second image pickup device for each of spectral characteristics corresponding to a plurality of color signals making up a color signal and a processing determining section that determines linear conversion as color conversion when the spectral difference value is equal to or less than a determination reference value and determines non-linear conversion as the color conversion when the spectral difference value is greater than the determination reference value.

13 Claims, 8 Drawing Sheets

U.S. PATENT DOCUMENTS

| | | |
|---|---|---|
| 6,980,231 B1 | 12/2005 | Ohsawa .................. 348/188 |
| 2004/0233295 A1 | 11/2004 | Hoshuyama ............... 348/222.1 |
| 2005/0174586 A1* | 8/2005 | Yoshida et al. ............... 382/167 |
| 2010/0182414 A1* | 7/2010 | Suzuki ........................ 348/71 |

FOREIGN PATENT DOCUMENTS

| | | |
|---|---|---|
| JP | 2000-341715 | 12/2000 |
| JP | 2001-358960 | 12/2001 |
| JP | 2004-215236 | 7/2004 |
| JP | 2005-117524 | 4/2005 |
| JP | 2006-222543 | 8/2006 |

OTHER PUBLICATIONS

International Search Report mailed Sep. 2, 2008 in corresponding PCT International Application No. PCT/JP2008/059185.

* cited by examiner

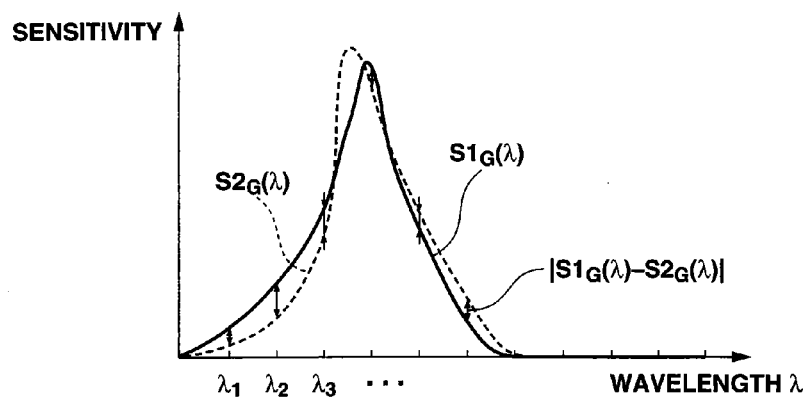
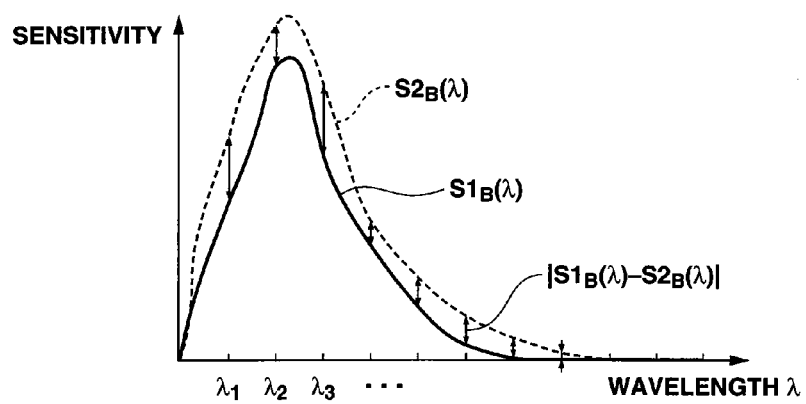
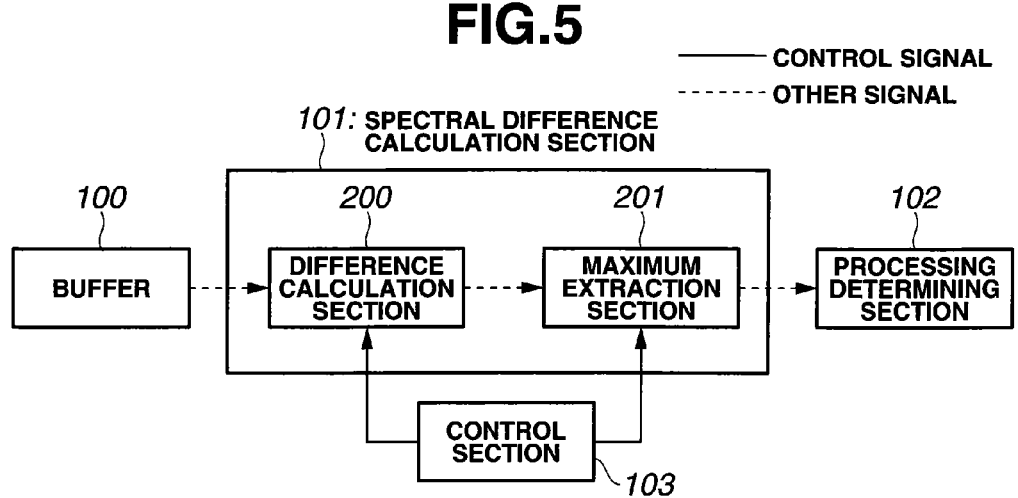

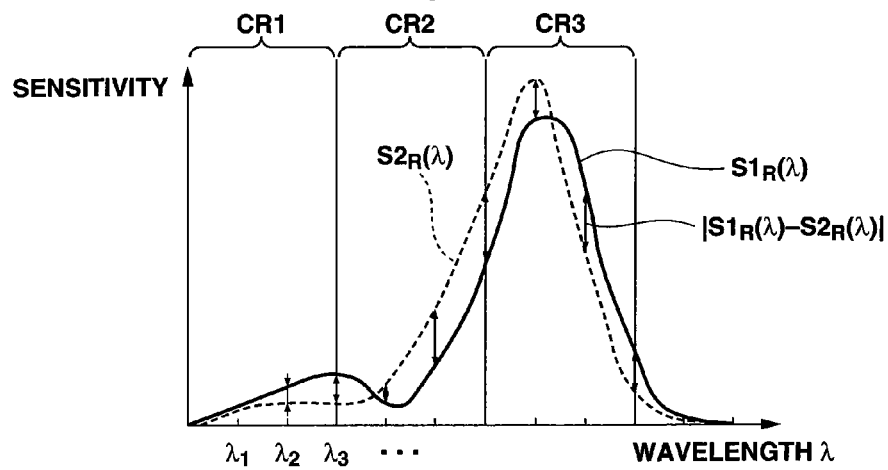
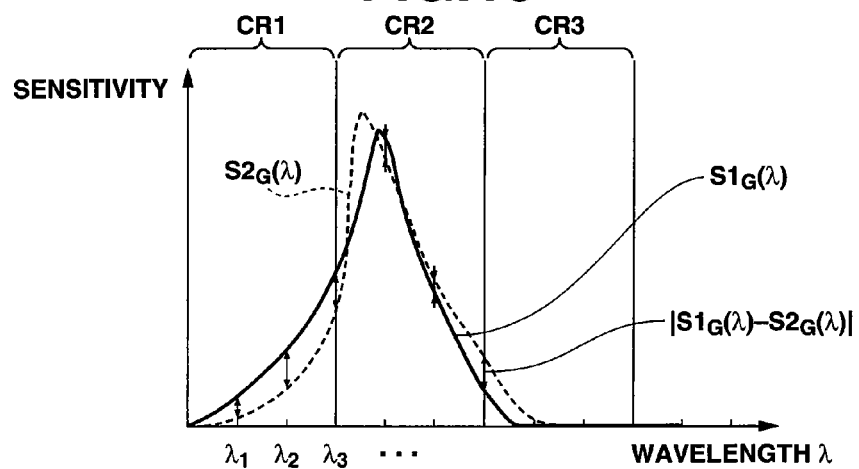
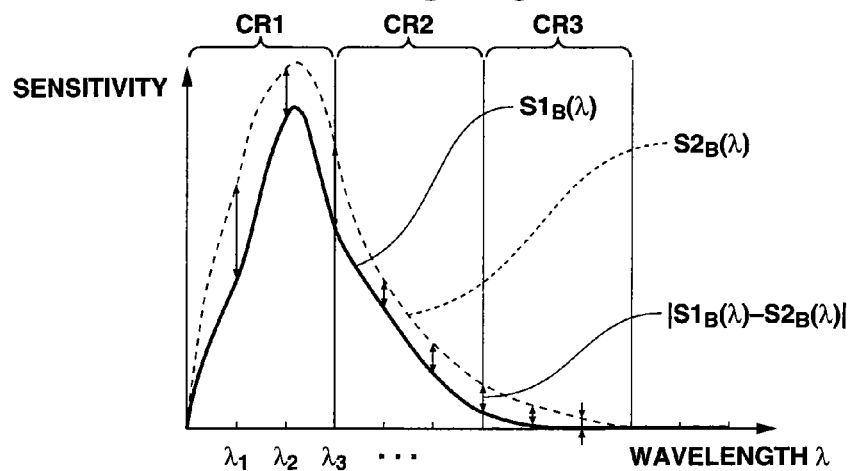

SIGNAL PROCESSING APPARATUS FOR DETERMINING COLOR CONVERSION PROCESSING FOR COLOR-CONVERTING SECOND COLOR SIGNAL OBTAINED BY SECOND IMAGE PICKUP DEVICE TO COLOR SIGNAL APPROXIMATE TO FIRST COLOR SIGNAL OBTAINED BY TARGET FIRST IMAGE PICKUP DEVICE AND NON-TRANSITORY COMPUTER-READABLE RECORDING MEDIUM FOR RECORDING SIGNAL PROCESSING PROGRAM FOR THE COLOR CONVERSION PROCESSING

CROSS REFERENCE TO RELATED APPLICATION

This application is a continuation application of PCT/JP2008/059185 filed on May 20, 2008 and claims benefit of Japanese Application No. 2007-145928 filed in Japan on May 31, 2007, the entire contents of which are incorporate herein by this reference.

BACKGROUND OF THE INVENTION

1. Field of the Invention

The present invention relates to a signal processing apparatus and a computer-readable recording medium for recording a signal processing program that determines a color conversion processing for approximating a color signal from an image pickup device to be processed to a color signal of a target image pickup device.

2. Description of the Related Art

Many image pickup apparatuses such as digital cameras and video cameras currently on the market are provided with an image pickup device with a primary color or complementary color filter disposed on a front thereof. However, spectral characteristics are known to differ depending on a type of color filter or a type of image pickup device. Such a difference in spectral characteristics causes color reproduction of an outputted image to vary depending on the image pickup device.

Furthermore, there are individual differences in spectral characteristics even in color filters and image pickup devices of a same type, and therefore color reproduction of outputted images may slightly differ even among image pickup devices of the same type using color filters of the same type.

A color management system (hereinafter referred to as "CMS") is a technique for absorbing such differences in color reproduction and aiming at realizing identical color reproduction. The CMS generally performs color conversion processing such as matrix conversion and table conversion so that a color signal to be processed matches a target color signal.

When color conversion processing through matrix conversion in the above-mentioned is performed, if a linear relationship holds between a color signal to be processed and a target color signal, high accuracy color reproduction can be realized at low cost, but if no linear relationship holds, high accuracy color reproduction cannot be expected.

On the other hand, when color conversion processing through the above described table conversion is performed, high accuracy color reproduction can be realized irrespective of whether or not a linear relationship holds between the color signal to be processed and the target color signal, but a large capacity memory is required to store table data, leading to increases in cost and power consumption of apparatuses.

To realize high accuracy color conversion processing at low cost while avoiding the above described problems, it is necessary to perform color conversion processing which is based on and suitable for such a relationship between the color signal to be processed and the target color signal.

Examples of techniques for solving the problems include Japanese Patent Application Laid-Open Publication No. 2001-358960, which describes a technique of deriving a conversion coefficient for realizing linear color conversion from a signal characterized by a first spectral sensitivity distribution to a signal characterized by a second spectral sensitivity distribution based on the first spectral sensitivity distribution and the second spectral sensitivity distribution. This technique calculates a conversion coefficient based on the first spectral sensitivity distribution and the second spectral sensitivity distribution and thereby provides an advantage of being able to realize stable color conversion processing independent of an illuminating light source or an object.

SUMMARY OF THE INVENTION

A signal processing apparatus according to an aspect of the present invention is a signal processing apparatus for determining a color conversion processing for color-converting a second color signal obtained through image pickup by a second image pickup device to be processed to a color signal approximate to a first color signal obtained through image pickup by a target first image pickup device, including a difference calculating section for calculating a spectral difference value indicating a difference between spectral characteristics of the first image pickup device and spectral characteristics of the second image pickup device and a processing determining section for determining linear conversion as the color conversion processing when the spectral difference value is equal to or less than a determination reference value and determining non-linear conversion as the color conversion processing when the spectral difference value is greater than the determination reference value.

A computer-readable recording medium for recording a signal processing program according to another aspect of the present invention is a recording medium for recording a signal processing program for determining a color conversion processing for color-converting a second color signal obtained through image pickup by a second image pickup device to be processed to a color signal approximate to a first color signal obtained through image pickup by a target first image pickup device, including a difference calculating step of calculating a spectral difference value indicating a difference between spectral characteristics of the first image pickup device and spectral characteristics of the second image pickup device and a processing determining step of determining linear conversion as the color conversion processing when the spectral difference value is equal to or less than a determination reference value and determining non-linear conversion as the color conversion processing when the spectral difference value is greater than the determination reference value.

BRIEF DESCRIPTION OF THE DRAWINGS

FIG. 3 is a diagram illustrating a difference between target spectral characteristics and spectral characteristics to be processed regarding a G signal according to Embodiment 1;

FIG. 4 is a diagram illustrating a difference between target spectral characteristics and spectral characteristics to be processed regarding a B signal according to Embodiment 1;

FIG. 5 is a block diagram showing a configuration of a spectral difference calculation section according to Embodiment 1;

FIG. 14 is a diagram illustrating a difference between target spectral characteristics and spectral characteristics to be processed per partial wavelength range regarding an R signal according to Embodiment 3;

FIG. 15 is a diagram illustrating a difference between target spectral characteristics and spectral characteristics to be processed per partial wavelength range regarding a G signal according to Embodiment 3;

FIG. 16 is a diagram illustrating a difference between target spectral characteristics and spectral characteristics to be processed per partial wavelength range regarding a B signal according to Embodiment 3;

DETAILED DESCRIPTION OF THE PREFERRED EMBODIMENTS

Embodiments of the present invention will be described below with reference to the drawings.

[Embodiment 1]

Figure 1:
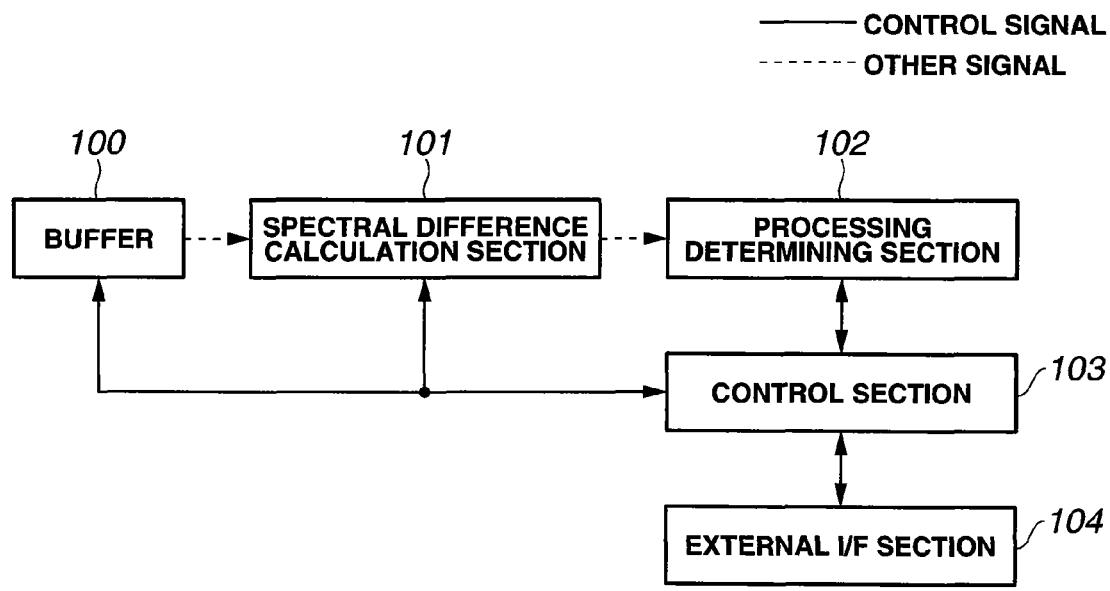
FIG. 1 is a block diagram showing a configuration of a signal processing apparatus according to Embodiment 1 of the present invention.
Figure 2:
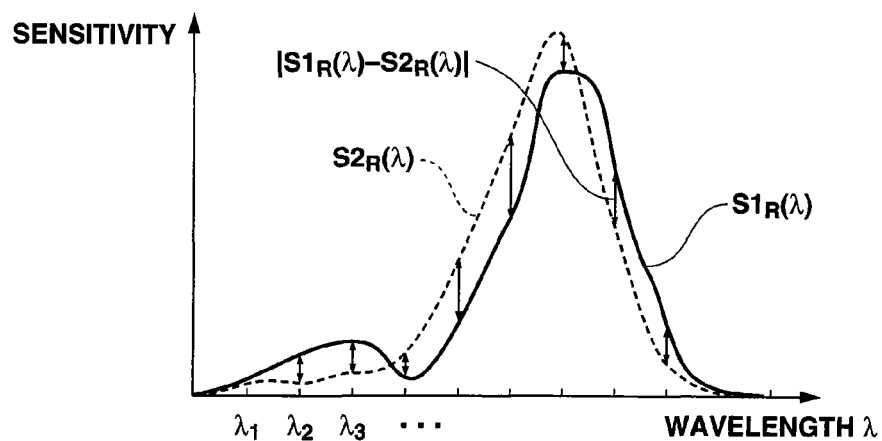
FIG. 2 is a diagram illustrating a difference between target spectral characteristics and spectral characteristics to be processed regarding an R signal according to Embodiment 1.
Figure 6:
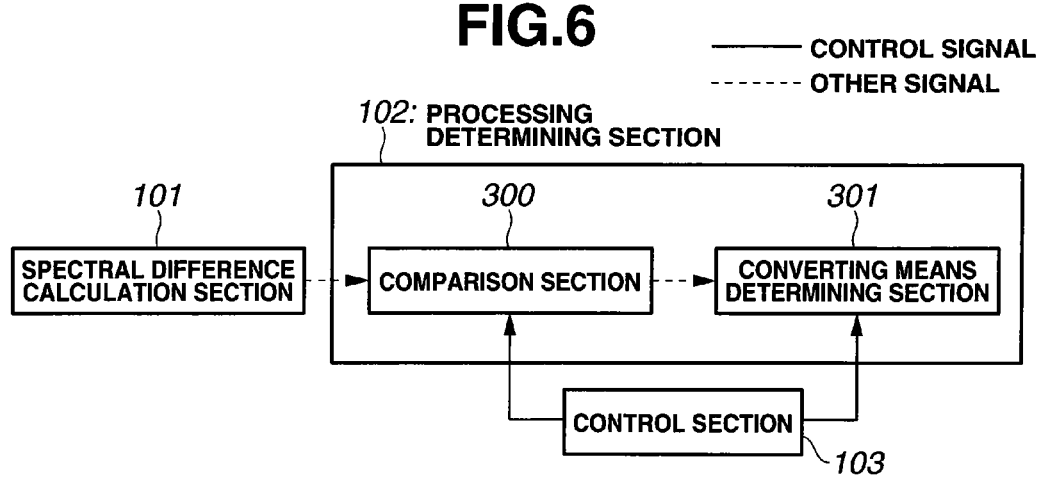
FIG. 6 is a block diagram showing a configuration of a processing determining section according to Embodiment 1.
Figure 7:
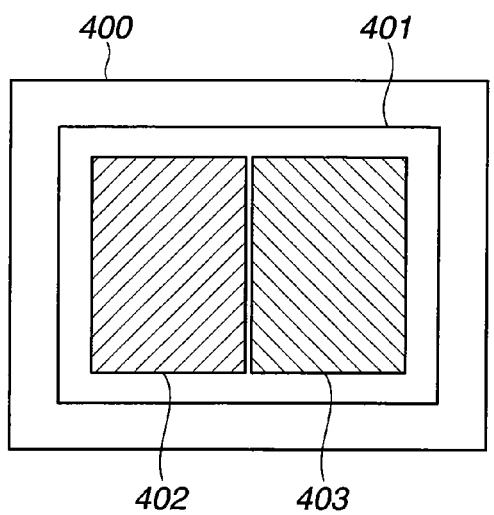
FIG. 7 is a view illustrating how a comparison evaluation target signal is painted on a display when a determination reference value is subjectively determined according to Embodiment 1.
Figure 8:
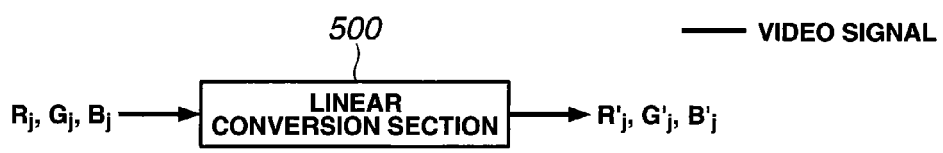
FIG. 8 is a block diagram showing an example where a linear conversion section is used as color converting means according to Embodiment 1.
Figure 9:
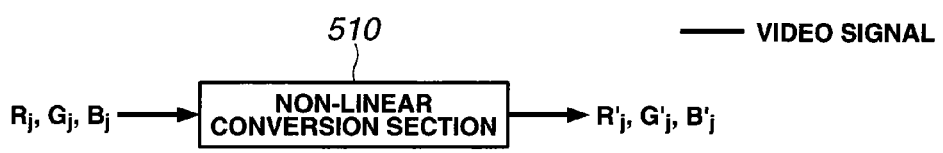
FIG. 9 is a block diagram showing an example where a non-linear conversion section is used as the color converting means according to Embodiment 1.
Figure 10:
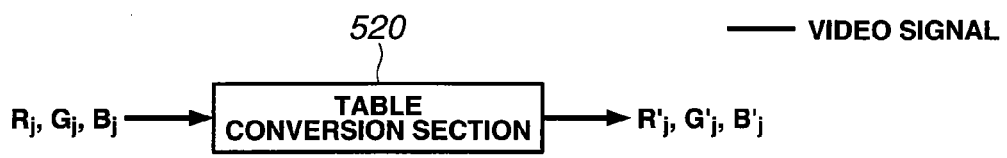
FIG. 10 is a block diagram showing an example where a table conversion section is used as the color converting means according to Embodiment 1.
Figure 11:
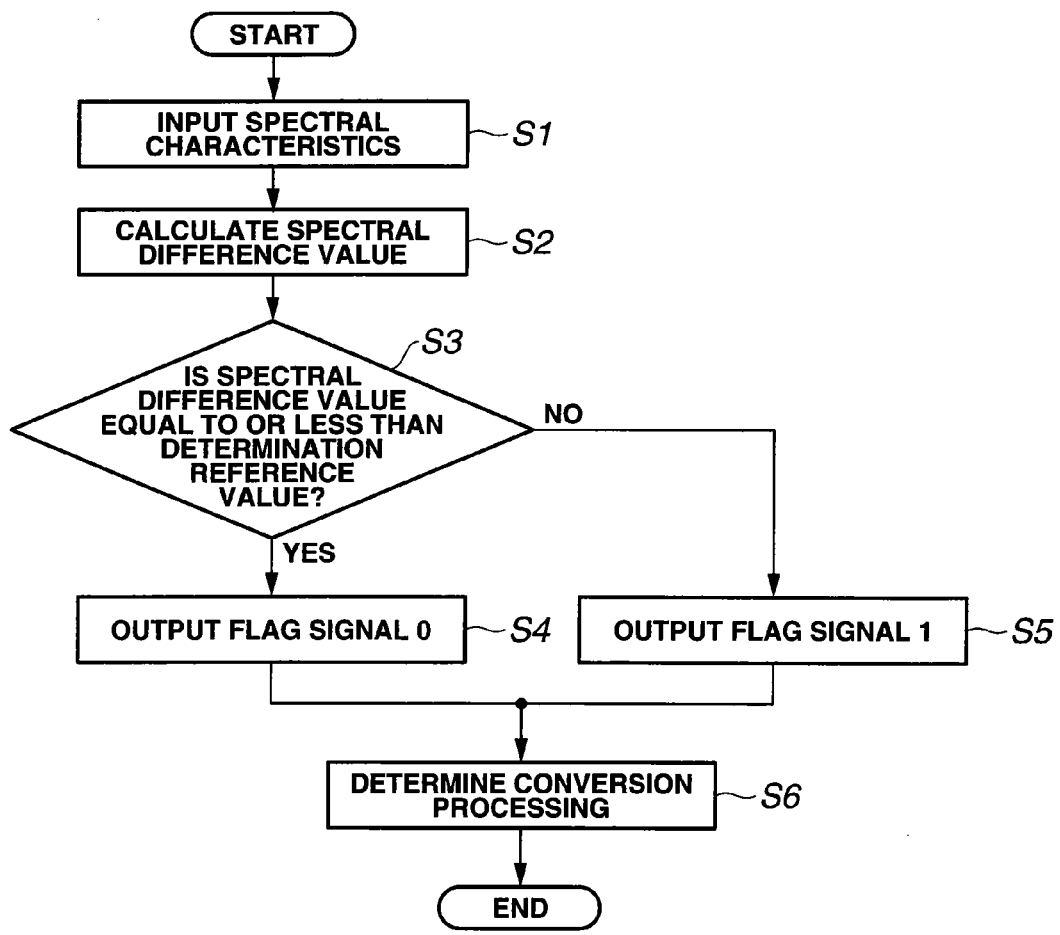
FIG. 11 is a flowchart showing operations of the signal processing apparatus according to Embodiment 1.

FIGS. 1 to 11 show Embodiment 1 of the present invention, FIG. 1 is a block diagram showing a configuration of a signal processing apparatus; FIG. 2 is a diagram illustrating a difference between target spectral characteristics and spectral characteristics to be processed regarding an R signal; FIG. 3 is a diagram illustrating a difference between target spectral characteristics and spectral characteristics to be processed regarding a G signal; FIG. 4 is a diagram illustrating a difference between target spectral characteristics and spectral characteristics to be processed regarding a B signal; FIG. 5 is a block diagram showing a configuration of a spectral difference calculation section; FIG. 6 is a block diagram showing a configuration of a processing determining section; FIG. 7 is a view illustrating how a comparison evaluation target signal is painted on a display when a determination reference value is subjectively determined; FIG. 8 is a block diagram showing an example where a linear conversion section is used as the color converting means; FIG. 9 is a block diagram showing an example where a non-linear conversion section is used as the color converting means; FIG. 10 is a block diagram showing an example where a table conversion section is used as the color converting means; FIG. 11 is a flowchart showing operations of the signal processing apparatus.

As shown in FIG. 1, the signal processing apparatus is provided with a buffer 100, a spectral difference calculation section 101 which is a difference calculating section, a processing determining section 102, a control section 103 and an external I/F section 104.

The buffer 100 is connected to the spectral difference calculation section 101. The spectral difference calculation section 101 is connected to the processing determining section 102. The control section 103, such as a microcomputer, is connected bidirectionally with the buffer 100, the spectral difference calculation section 101 and the processing determining section 102 so as to control these sections. Furthermore, the external I/F section 104 includes an interface for turning ON/OFF power (e.g., power switch) and an interface for inputting data or the like and is connected bidirectionally with the control section 103.

Operations of the signal processing apparatus as illustrated in FIG. 1 will be explained according to a signal flow.

Spectral characteristics of a target image pickup device for color reproduction and spectral characteristics of an image pickup device to be processed are inputted to the signal processing apparatus via the external I/F section 104. Assuming a CCD with a Bayer type primary color filter disposed on a front as the image pickup device, FIGS. 2 to 4 schematically illustrate an example of relationship between spectral characteristics of a target image pickup device and spectral characteristics of an image pickup device to be processed. FIGS. 2 to 4 illustrate the target spectral characteristics using a solid line and the spectral characteristics to be processed using a broken line respectively.

Suppose the spectral characteristics of the image pickup device inputted via the external I/F section 104 is more specifically typical spectral characteristics described in a product catalog of each type of image pickup device. Of course, this is an example and the spectral characteristics inputted are not limited to the spectral characteristics in such a catalog, and as another example, spectral characteristics of individual image pickup devices obtained through actual measurement using a spectrometer may also be used. The use of spectral characteristics in a catalog has an advantage of being able to easily acquire data. On the other hand, when spectral characteristics obtained through actual measurement are used, data cannot be obtained without measurement, whereas there is an advantage of being able to correspond to individual differences among image pickup devices.

The spectral characteristics inputted via the external I/F section 104 are transferred to and saved in the buffer 100 via the control section 103.

The spectral characteristics saved in the buffer 100 are transferred to the spectral difference calculation section 101.

The spectral difference calculation section 101 calculates a difference between the two spectral characteristics obtained via the buffer 100 and transfers the calculated difference to the processing determining section 102.

The processing determining section 102 determines an appropriate color conversion processing based on the difference between the two spectral characteristics obtained via the spectral difference calculation section 101.

As described above, since the spectral characteristics vary depending on the type of a color filter or depending on the type of an image pickup device, color reproduction of the outputted image varies depending on the image pickup device. Here, the "difference in spectral characteristics" means a difference in a value per wavelength between spectral characteristics, a shift in a wavelength direction of a peak point at which a distribution of spectral characteristics reaches a maximum, a difference in a distribution width in the wavelength direction of spectral characteristics or the like.

It is therefore an object of this signal processing apparatus to realize color reproduction with a small difference between a plurality of image pickup devices (reproduction of colors as similar as possible to each other) by absorbing differences in spectral characteristics through some processing (by carrying out the optimum color conversion processing according to an image pickup device).

When there is no sufficient linearity between target spectral characteristics and spectral characteristics to be processed as described above, it is difficult to realize color reproduction of a high degree of similitude through a linear color conversion processing. The extent to which this linearity is lost can be generally considered as the magnitude of difference on a premise that both spectral characteristics have been standardized (e.g., on a premise that values obtained by integrating the respective spectral characteristics with respect to a wavelength $\lambda$ are identical).

Therefore, the spectral difference calculation section 101 calculates the magnitude of difference and the processing determining section 102 selects the linear color conversion processing such as matrix conversion when the difference is small or a non-linear color conversion processing such as table conversion when the difference is large.

Thus, the signal processing apparatus determines the optimum color conversion processing according to the magnitude of difference between spectral characteristics of a target image pickup device of color reproduction and spectral characteristics of an image pickup device to be subjected to the color conversion processing.

Next, an example of configuration of the spectral difference calculation section 101 will be explained with reference to FIG. 5.

The spectral difference calculation section 101 is configured by including a difference calculation section 200 which is a difference value calculating section and a maximum extraction section 201 which is maximum extracting section. The buffer 100 is connected to the difference calculation section 200. The difference calculation section 200 is connected to the maximum extraction section 201. The maximum extraction section 201 is connected to the processing determining section 102. The control section 103 is bidirectionally connected with the difference calculation section 200 and the maximum extraction section 201 so as to control these sections.

The difference calculation section 200 reads spectral characteristics of a target image pickup device of color reproduction and spectral characteristics of the image pickup device to be processed from the buffer 100 and calculates a difference between the spectral characteristics. Here, the difference in spectral characteristics can be calculated using various methods and can be calculated using following Expression 1 as an example.

$$diff_R = \frac{1}{N} \sum_\lambda |S1_R(\lambda) - S2_R(\lambda)|$$ [Expression 1]

$$diff_G = \frac{1}{N} \sum_\lambda |S1_G(\lambda) - S2_G(\lambda)|$$

-continued $$diff_B = \frac{1}{N} \sum_\lambda |S1_B(\lambda) - S2_B(\lambda)|$$

Here, $S1_R(\lambda)$, $S1_G(\lambda)$ and $S1_B(\lambda)$ denote spectral characteristics of a target R signal, G signal and B signal and $S2_R(\lambda)$, $S2_G(\lambda)$ and $S2_B(\lambda)$ denote spectral characteristics of an R signal, G signal and B signal to be processed respectively. Furthermore, $diff_R$, $diff_G$ and $diff_B$ denote the magnitude of difference of spectral characteristics regarding the R signal, G signal and B signal respectively. Furthermore, $\lambda$ denotes a wavelength and N denotes a total sampling number when spectral characteristics are sampled in the wavelength direction.

According to the present embodiment, suppose the range of wavelength $\lambda$ of the sum operation in Expression 1 is, for example, 380 nm to 780 nm and sampling is performed at intervals of, for example, 10 nm in this range. In this case, the total sampling number N is 41.

Thus, in the example shown in Expression 1, the average of absolute values of a difference per wavelength between the target spectral characteristics and the spectral characteristics to be processed is calculated for each of the three color signals, that is, R signal, G signal and B signal and these are used as $diff_R$, $diff_G$ and $diff_B$ of the spectral characteristics.

The differences $diff_R$, $diff_G$ and $diff_B$ of the spectral characteristics regarding the R,G,B color signals calculated by the difference calculation section 200 are transferred to the maximum extraction section 201. The maximum extraction section 201 calculates a spectral difference value diff which is the magnitude of the difference between the target spectral characteristics and the spectral characteristics to be processed based on $diff_R$, $diff_G$ and $diff_B$ obtained from the difference calculation section 200 as shown in following Expression 2.

$$diff = \max(diff_R, diff_G, diff_B)$$ [Expression 2]

Here, max(x, y, z) denotes an operation of taking a maximum value of x, y and z. Therefore, a maximum value of differences $diff_R$, $diff_G$ and $diff_B$ of spectral characteristics is obtained as a spectral difference value diff.

The spectral difference value diff calculated from the maximum extraction section 201 is transferred to the processing determining section 102.

Next, an example of configuration of the processing determining section 102 will be explained with reference to FIG. 6.

This processing determining section 102 is configured by including a comparison section 300 and a converting means determining section 301. The spectral difference calculation section 101 is connected to the comparison section 300. The comparison section 300 is connected to the converting means determining section 301. The control section 103 is bidirectionally connected with the comparison section 300 and the converting means determining section 301 so as to control these sections.

The comparison section 300 compares the spectral difference value diff from the spectral difference calculation section with a determination reference value refval which serves as an index for determining the color conversion processing and sets a flag signal flag as shown in, for example, Expression 3 shown below.

$$flag = \begin{cases} 0 & (diff \leq refval) \\ 1 & (diff > refval) \end{cases}$$ [Expression 3]

Therefore, the flag signal flag indicates whether the spectral difference value diff is equal to or less or greater than the determination reference value refval.

The determination reference value refval is determined using, for example, a method shown below.

First, values per wavelength λ of first spectral characteristics $S1_R(\lambda)$, $S1_G(\lambda)$ and $S1_B(\lambda)$ are multiplied by wavelength-independent coefficients $\alpha^{kR}_R$, $\alpha^{kG}_G$ and $\alpha^{kB}_B$ and spectral characteristics $S1'^{kR}_R(\lambda)$, $S1'^{kG}_G(\lambda)$ and $S1'^{kB}_B(\lambda)$ are calculated as shown in Expression 4 below.

$$S1'^{kR}_R(\lambda) = \alpha^{kR}_R \cdot S1_R(\lambda)$$

$$S1'^{kG}_G(\lambda) = \alpha^{kG}_G \cdot S1_G(\lambda)$$

$$S1'^{kB}_B(\lambda) = \alpha^{kB}_B \cdot S1_B(\lambda) \quad \text{[Expression 4]}$$

Here, suppose the coefficients $\alpha^{kR}_R$, $\alpha^{kG}_G$ and $\alpha^{kB}_B$ are values between, for example, 1.0 and 2.0 and the respective coefficients are made to gradually change in increments of 0.1 independently of each other. Indices indicating gradual changes of the respective coefficients are kR, kG and kB and the indices take values of 1 to 11 respectively. Therefore, there are kR, kG, kB=11×11×11=1331 combinations of $\alpha^{kR}_R$, $\alpha^{kG}_G$ and $\alpha^{kB}_B$ in this case. Hereinafter, a combination of these indices kR, kG and kB will be expressed by an identification number k. That is, the identification number k takes a value k=1 to 1331 in the present embodiment.

Next, averages $\text{diff1}^{kR}_R$, $\text{diff1}^{kG}_G$ and $\text{diff1}^{kB}_B$ of the absolute values of a difference per wavelength λ between the spectral characteristics $S1'^{kR}_R(\lambda)$, $S1'^{kG}_G(\lambda)$ and $S1'^{kB}_B(\lambda)$ calculated by Expression 4 and the original spectral characteristics $S1_R(\lambda)$, $S1_G(\lambda)$ and $S1_B(\lambda)$ are calculated by following Expression 5.

$$\begin{aligned} \text{diff1}^{kR}_R &= \frac{1}{N}\sum_\lambda |S1_R(\lambda) - S1'^{kR}_R(\lambda)| \\ &= \frac{1}{N}\sum_\lambda |S1_R(\lambda) - \alpha^{kR}_R \cdot S1_R(\lambda)| \\ &= \frac{|1-\alpha^{kR}_R|}{N}\sum_\lambda |S1_R(\lambda)| \end{aligned} \quad \text{[Expression 5]}$$

$$\begin{aligned} \text{diff1}^{kG}_G &= \frac{1}{N}\sum_\lambda |S1_G(\lambda) - S1'^{kG}_G(\lambda)| \\ &= \frac{1}{N}\sum_\lambda |S1_G(\lambda) - \alpha^{kG}_G \cdot S1_G(\lambda)| \\ &= \frac{|1-\alpha^{kG}_G|}{N}\sum_\lambda |S1_G(\lambda)| \end{aligned}$$

$$\begin{aligned} \text{diff1}^{kB}_B &= \frac{1}{N}\sum_\lambda |S1_B(\lambda) - S1'^{kB}_B(\lambda)| \\ &= \frac{1}{N}\sum_\lambda |S1_B(\lambda) - \alpha^{kB}_B \cdot S1_B(\lambda)| \\ &= \frac{|1-\alpha^{kB}_B|}{N}\sum_\lambda |S1_B(\lambda)| \end{aligned}$$

Next, spectral difference value $\text{diff1}^k$ is calculated as shown in Expression 6 below based on the $\text{diff1}^{kR}_R$, $\text{diff1}^{kG}_G$ and $\text{diff1}^{kB}_B$ obtained from Expression 5.

$$\text{diff1}^k = \max(\text{diff1}^{kR}_R, \text{diff1}^{kG}_G, \text{diff1}^{kB}_B) \quad \text{[Expression 6]}$$

That is, spectral difference value $\text{diff1}^k$ is a value that becomes a maximum among the $\text{diff1}^{kR}_R$, $\text{diff1}^{kG}_G$ and $\text{diff1}^{kB}_B$. Therefore, the number of spectral difference values $\text{diff1}^k$ obtained corresponds to a total number of k, that is, 1331 here.

Next, suppose a standard color chart such as Macbeth chart (suppose a spectral reflection factor of this color chip is $O_i(\lambda)$, where i is an identification number of each color chip) and a light source of spectral emissivity $L(\lambda)$. Here, suppose the spectral reflection factor $O_i(\lambda)$ of the color chip has been measured beforehand using a spectrometer. Furthermore, suppose an optimum type of light source is selected for the spectral emissivity $L(\lambda)$ of the light source assuming environmental conditions for picking up an image using an image pickup apparatus to be designed. For example, when an image is assumed to be taken under daylight, a spectral emissivity of standard light source D65 may be used.

Next, the color chips of the aforementioned spectral reflection factor $O_i(\lambda)$ are illuminated with the light source of the aforementioned spectral emissivity $L(\lambda)$ and $R1_i$, $G1_i$, $B1_i$ signals obtained by taking images of the color chips using image pickup devices of the spectral characteristics $S1_R(\lambda)$, $S1_G(\lambda)$ and $S1_B(\lambda)$ are calculated as shown in Expression 7.

$$R1_i = \sum_\lambda S1_R(\lambda) \cdot L(\lambda) \cdot O_i(\lambda) \quad \text{[Expression 7]}$$

$$G1_i = \sum_\lambda S1_G(\lambda) \cdot L(\lambda) \cdot O_i(\lambda)$$

$$B1_i = \sum_\lambda S1_B(\lambda) \cdot L(\lambda) \cdot O_i(\lambda)$$

Here, the number of $R1_i$, $G1_i$, $B1_i$ signals obtained correspond to the number of color chips i.

Likewise, the color chips of the aforementioned spectral reflection factor $O_i(\lambda)$ are illuminated with the light source of the aforementioned spectral emissivity $L(\lambda)$ and an $R1'^k_i$, $G1'^k_i$, $B1'^k_i$ signal obtained by taking images of the color chips using image pickup devices of the spectral characteristics $S1'^{kR}_R(\lambda)$, $S1'^{kG}_G(\lambda)$ and $S1'^{kB}_B(\lambda)$ is calculated as shown in Expression 8.

$$R1'^{kR}_i = \sum_\lambda S1'^{kR}_R(\lambda) \cdot L(\lambda) \cdot O_i(\lambda) \quad \text{[Expression 8]}$$

$$G1'^{kG}_i = \sum_\lambda S1'^{kG}_G(\lambda) \cdot L(\lambda) \cdot O_i(\lambda)$$

$$B1'^{kB}_i = \sum_\lambda S1'^{kB}_B(\lambda) \cdot L(\lambda) \cdot O_i(\lambda)$$

Here, the number of $R1'^k_i$, $G1'^k_i$, $B1'^k_i$ signals is obtained by multiplying the number of color chips i by 1331 which is the total number of k.

Next, the value of $R1_i$, $G1_i$, $B1_i$ signal and the value of the $R1'^k_i$, $G1'^k_i$, $B1'^k_i$ signal are painted for each color chip i on a plane of a rectangular region using paint software or the like and are displayed side by side on a screen of a display of a personal computer or the like. Here, FIG. 7 shows a display example. In the example shown in FIG. 7, on a screen 401 of a display 400, a rectangular region 402 in which the value of the $R1_i$, $G1_i$, $B1_i$ signal is painted and a rectangular region 403 in which the value of the $R1'^k_i$, $G1'^k_i$, $B1'^k_i$ signal is painted are displayed side by side for ease of comparison.

The respective color chips i displayed side by side are subjectively compared and evaluated. This subjective comparison and evaluation are performed depending on whether or not the displays of the left and right rectangular regions 402 and 403 can be accepted as identical to the sight. In the present embodiment, suppose the values of $\alpha^{kR}_R$, $\alpha^{kG}_G$ and $\alpha^{kB}_B$ are changed within a range of 1.0 to 2.0 in increments of 0.1 independently of each other and a total of k=11×11×11=1331 combinations of comparison and evaluation are carried out for each color chip i. Therefore, the total number of comparisons is M×1331 (where M denotes the total number of color chips i).

When an evaluator subjectively evaluates that an error to the sight cannot be accepted, the spectral difference value diff1$^k$ corresponding to k at that time is picked up. As a result of the evaluation on all i and k, a minimum spectral difference value diff1$^k$ among a plurality of finally picked up spectral difference values diff1$^k$ is used as a determination reference value refval of the color conversion processing. The color difference to the sight of subjective evaluators is considered to vary over quite a large range depending on individual perceptions. Therefore, in order to obtain color reproduction with high accuracy for many people, it is essential that many evaluators compare colors and acquire data. In this case, the determination reference value refval determined for each evaluator is statistically processed and the determination reference value refval is thereby determined. To be more specific, the average value of the determination reference value refval for each evaluator is used as a true determination reference value refval or the like.

The above described example is a case where the determination reference value refval is determined based on a subjective evaluation, but the means for determining the determination reference value refval is not limited thereto. For example, the determination reference value refval may be determined based on the value of a color difference in an L*a*b* color specification system and this will be described below.

First, the R1$_i$, G1$_i$, B1$_i$ signal calculated for a certain color chip i as shown in Expression 7 is converted to an L*1$_i$, a*1$_i$, b*1$_i$ signal of an L*a*b* colormetric system. Furthermore, the R1'$^k_i$, G1'$^k_i$, B1'$^k_i$ signal calculated for the same color chip i as shown in Expression 8 is converted to an L*1'$^k_i$, a*1'$^k_i$, b*1'$^k_i$ signal of the L*a*b* color specification system for a certain combination k of kR, kG and kB.

Next, a color difference $\Delta E^k_i$ between the L*1$_i$, a*1$_i$, b*1$_i$ signal and L*1'$^k_i$, a*1'$^k_i$, b*1'$^k_i$ signal for each color chip i is calculated as shown in Expression 9.

$$\Delta E^k_i = \sqrt{(L^*1_i - L^*1'^k_i)^2 + (a^*1_i - a^*1'^k_i)^2 + (b^*1_i - b^*1'^k_i)^2} \quad \text{[Expression 9]}$$

Here, the color difference $\Delta E^k_i$ denotes a color difference of each color chip i regarding a certain combination k of kR, kG and kB.

Next, an average color difference $Ave\Delta E^k$ as shown in Expression 10 below is calculated using the color difference $\Delta E^k_i$ calculated for all color chips i using Expression 9.

$$Ave\Delta E^k = \frac{1}{M}\sum_{i=1}^{M} \Delta E^k_i \quad \text{[Expression 10]}$$

Here, M denotes the total number of color chip i as described above.

Such calculations are carried out for a total k=11×11×11=1331 combinations of $\alpha^{kR}_R$, $\alpha^{kG}_G$ and $\alpha^{kB}_B$ whose values are made to change in increments of 0.1 over a range of 1.0 to 2.0.

An upper limit value is then set to an approximate value to or below which the average color difference $Ave\Delta E^k$ is to be suppressed. Here, suppose the upper limit value is set, for example, to 3. When this average color difference $Ave\Delta E^k$ is to be set to 3 or less, all spectral difference values diff1$^k$ when $Ave\Delta E^k$ falls to 3 or below are picked up and a maximum value among the plurality of finally picked up spectral difference values diff1$^k$ is defined as the determination reference value refval of the color conversion processing.

The use of such a technique allows the determination reference value refval to be determined without depending on subjective evaluations.

Returning to the explanation of FIG. 6, the flag signal flag calculated by the comparison section 300 is transferred to the converting means determining section 301.

The converting means determining section 301 determines the color conversion processing based on the flag signal flag transferred from the comparison section 300 as shown, for example, in Expression 11 below.

$$\text{method} = \begin{cases} \text{method1} & (\text{flag} = 0) \\ \text{method2} & (\text{flag} = 1) \end{cases} \quad \text{[Expression 11]}$$

The "method" denotes the color conversion processing, and "method1" and "method2" denote different predetermined color conversion processings. According to the present embodiment, suppose, for example, method1 is the color conversion processing by linear conversion and method2 is the color conversion processing by non-linear conversion. Here, the linear conversion includes matrix conversion and the non-linear conversion includes conversion by a non-linear calculation or conversion through a table. A combined conversion of linear conversion and non-linear conversion is non-linear conversion. Furthermore, when non-linear conversion is performed, conversion by a non-linear calculation is preferably applied to a processing system at high processing speed and conversion through a table is preferably applied to a processing system with a large memory capacity. Thus, linear conversion is selected when the difference in spectral characteristics is small and non-linear conversion or the like is selected when the difference in spectral characteristics is large.

Next, several examples of the color converting means will be explained with reference to FIG. 8 to FIG. 10. The color converting means may be provided within the signal processing apparatus, but may also be provided independently of the signal processing apparatus for performing a color conversion based on the color conversion processing determined by the signal processing apparatus.

First, a linear conversion section 500 shown in FIG. 8 serves as both the color converting means and the linear converting section, and performs color conversion processing by performing matrix conversion as shown in Expression 12 on an R$_j$ G$_j$, B$_j$ signal inputted from the image pickup device to be processed (where, j denotes coordinates of the respective pixels constituting an image).

$$\begin{pmatrix} R'_j \\ G'_j \\ B'_j \end{pmatrix} = \begin{pmatrix} a1 & a2 & a3 \\ a4 & a5 & a6 \\ a7 & a8 & a9 \end{pmatrix} \begin{pmatrix} R_j \\ G_j \\ B_j \end{pmatrix} \quad \text{[Expression 12]}$$

Furthermore, a1 to a9 denote matrix coefficients. These matrix coefficients a1 to a9 are calculated, for example, using a least squares method so that an error in numerical values between a color signal outputted from the image pickup device which becomes a target of color reproduction and a color signal after applying the color conversion processing of Expression 12 to the above described color signal outputted from the image pickup device to be processed becomes a minimum.

Next, a non-linear conversion section 510 shown in FIG. 9 serves as both the color converting means and the non-linear converting section and performs the color conversion processing by performing a conversion by a non-linear calculation as shown, for example, in next Expression 13 on the $R_j$, $G_j$, $B_j$ signal inputted from the target image pickup device.

$$R'_j = b \cdot R_j^2 + c \cdot G_j^2 + d \cdot B_j^2$$

$$G'_j = e \cdot R_j^2 + f \cdot G_j^2 + g \cdot B_j^2$$

$$B'_j = k \cdot R_j^2 + l \cdot G_j^2 + m \cdot B_j^2 \qquad \text{[Expression 13]}$$

Here, b to g and k to m denote predetermined coefficients used for a conversion through a non-linear calculation. Just as when the aforementioned matrix coefficients a1 to a9 are calculated, these coefficients b to g and k to m are calculated using a least squares method so that an error in numerical values between a color signal outputted from the image pickup device which becomes a target of color reproduction and a color signal after applying the color conversion processing of Expression 13 to the above described color signal outputted from the image pickup device to be processed becomes a minimum. The color conversion processing through a non-linear calculation shown in Expression 13 performs the color conversion processing based on, for example, a non-linear quadratic function (however, it goes without saying that such a function is not limited to a quadratic function).

Next, a table conversion section 520 shown in FIG. 10 serves as both the color converting means and the non-linear converting section, and reads an output $R'_j$, $G'_j$, $B'_j$ signal corresponding to an signal inputted from the image pickup device to be processed with reference to a predetermined table. Therefore, the table conversion section 520 stores the correspondence between the inputted $R_j$, $G_j$, $B_j$ signal and outputted $R'_j$, $G'_j$, $B'_j$ signal as table data beforehand.

In the above described Expression 11 or the like, the color conversion processing is selected from among the two methods of method1 and method2, but the methods are not limited thereto. For example, such a configuration may be adopted that a plurality of determination reference values refval may be provided (that is, a second determination reference value which is greater than a determination reference value refval or the like is provided) and one of three or more color conversion processing may be selected. Furthermore, when, for example, a table conversion is used, the table size of table conversion may be changed according to the spectral difference value (that is, when the spectral difference value is greater than the determination reference value refval, the spectral difference value is further compared with the second determination reference value, and when the spectral difference value is greater than the second determination reference value, the color conversion processing may be determined to a conversion through a table having a greater table size than when the spectral difference value is equal to or less than the second determination reference value). Here, when, for example, the table size is reduced, there can be a combination of input color signals for which there are no corresponding parts by only directly looking up the table. In this case, publicly known linear interpolation processing or the like may be applied to the data in the stored table and the color signal after the interpolation may be used as a color signal after the color conversion processing.

The above description presupposes hardware processing, but the present invention need not be limited to such a configuration, but a computer may be caused to execute a signal processing program which is separate software and perform processing.

A processing flow through a signal processing program will be explained with reference to FIG. 11.

When this processing is started, spectral characteristics data of the image pickup device which is the target of color reproduction which is described, for example, as text data beforehand and spectral characteristics data of the image pickup device which is the processing target are inputted (step S1).

Next, a calculation as shown in Expression 1 is carried out to take the average of absolute values of a difference per wavelength between the two spectral characteristics regarding each color signal, a calculation as shown in Expression 2 is further carried out and a maximum average value regarding each color signal is calculated as a spectral difference value (step S2).

Next, the calculated spectral difference value is compared with the determination reference value which is an index for judging the color conversion processing (step S3).

Here, when the spectral difference value is equal to or less than the determination reference value, "0" is outputted as the flag signal (step S4).

Furthermore, when the spectral difference value in step S3 is greater than the determination reference value, "1" is outputted as a flag signal (step S5).

When the processing in step S4 or step S5 is finished, the color conversion processing is determined according to the flag signal outputted in any one of these steps (step S6) and this processing is then finished.

The signal processing apparatus and signal processing program have been described above, but the present invention is not limited thereto and can be, for example, a computer-readable recording medium for recording a signal processing program or signal processing method for carrying out the aforementioned processing.

According to such Embodiment 1, since the color conversion processing is determined according to the magnitude of a difference between spectral characteristics of a target image pickup device of color reproduction and spectral characteristics of an image pickup device to be processed, it is possible to perform the color conversion processing with high accuracy according to the image pickup device. Furthermore, since the appropriate color conversion processing is determined according to the image pickup device, it is possible to construct a system on minimum necessary and optimum scale and achieve a cost reduction.

[Embodiment 2]

Figure 12:
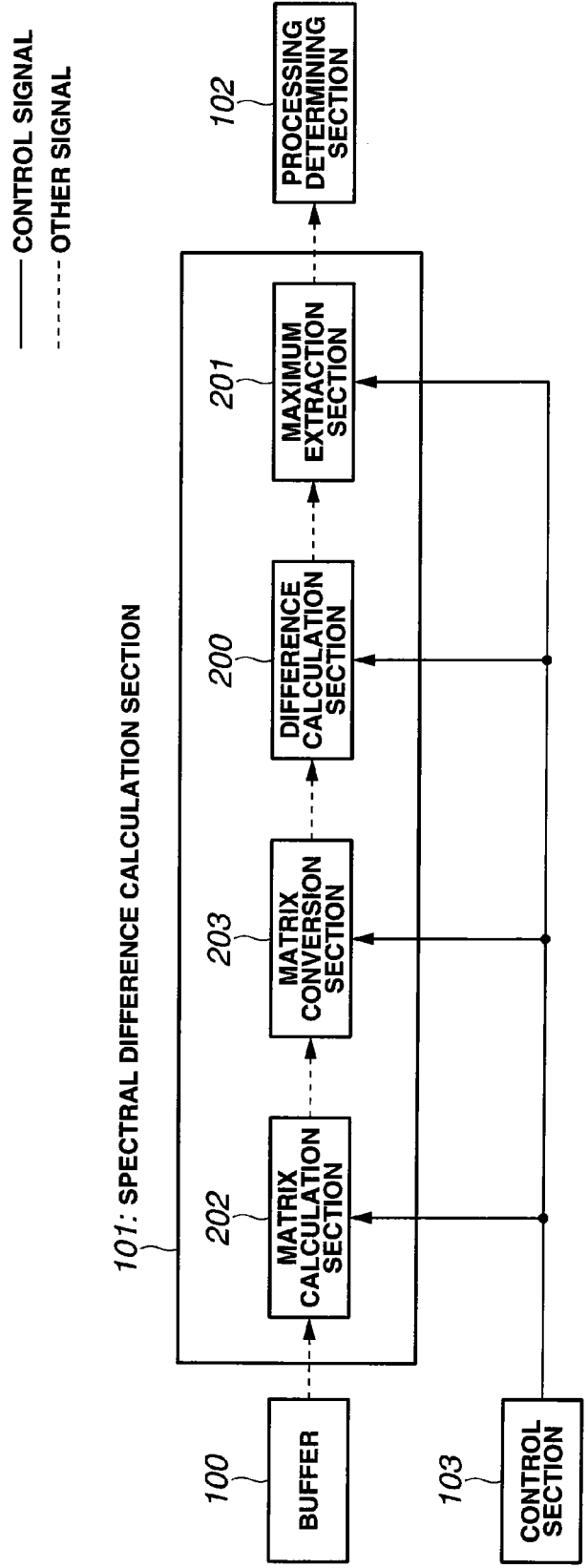
FIG. 12 is a block diagram showing a configuration of a spectral difference calculation section according to Embodiment 2 of the present invention.

FIG. 12 shows Embodiment 2 of the present invention and is a block diagram illustrating a configuration of a spectral difference calculation section. In Embodiment 2, parts similar to those in Embodiment 1 will be assigned the same reference numerals and explanations thereof will be omitted and only differences will be mainly explained.

A case has been explained in aforementioned Embodiment 1 where a spectral difference value is calculated by taking the average of absolute values of a difference per wavelength between two spectral characteristics. On the other hand, the present embodiment differentiates the method of calculating spectral difference values.

A spectral difference calculation section 101 according to the present embodiment shown in FIG. 12 corresponds to the configuration of the spectral difference calculation section 101 shown in FIG. 5 with a matrix calculation section 202 which is a matrix calculating section and a matrix conversion section 203 which is a matrix converting section added. The rest of the configuration of the signal processing apparatus according to the present embodiment is similar to that of aforementioned Embodiment 1.

As shown in FIG. 12, a buffer 100 is connected to the matrix calculation section 202. The matrix calculation section 202 is connected to the matrix conversion section 203. The matrix conversion section 203 is connected to the difference calculation section 200. The control section 103 is also bidirectionally connected with the matrix calculation section 202 and the matrix conversion section 203 so as to control these sections.

The matrix calculation section 202 reads spectral characteristics of a target image pickup device of color reproduction and spectral characteristics of an image pickup device to be processed from the buffer 100 and calculates coefficients of the matrix of the right side of (A) of Expression 14 that minimizes the values shown in (B) of following Expression 14 using, for example, a least squares method.

[Expression 14]

$$\begin{pmatrix} x_R(\lambda) \\ x_G(\lambda) \\ x_B(\lambda) \end{pmatrix} = \begin{pmatrix} S1_R(\lambda) \\ S1_G(\lambda) \\ S1_B(\lambda) \end{pmatrix} - \begin{pmatrix} p1 & p2 & p3 \\ p4 & p5 & p6 \\ p7 & p8 & p9 \end{pmatrix} \begin{pmatrix} S2_R(\lambda) \\ S2_G(\lambda) \\ S2_B(\lambda) \end{pmatrix} \quad \text{(A)}$$

$$\begin{cases} \sum_\lambda \{x_R(\lambda)\}^2 \\ \sum_\lambda \{x_G(\lambda)\}^2 \\ \sum_\lambda \{x_B(\lambda)\}^2 \end{cases} \quad \text{(B)}$$

Here p1 to p9 denote matrix coefficients.

The calculated matrix coefficients p1 to p9 are transferred to the matrix conversion section 203.

The matrix conversion section 203 multiplies target spectral characteristics $S2_R(\lambda)$, $S2_G(\lambda)$ and $S2_B(\lambda)$ by the matrix coefficients p1 to p9 transferred from the matrix calculation section 202 as shown in Expression 15 below.

$$\begin{pmatrix} S2'_R(\lambda) \\ S2'_G(\lambda) \\ S2'_B(\lambda) \end{pmatrix} = \begin{pmatrix} p1 & p2 & p3 \\ p4 & p5 & p6 \\ p7 & p8 & p9 \end{pmatrix} \begin{pmatrix} S2_R(\lambda) \\ S2_G(\lambda) \\ S2_B(\lambda) \end{pmatrix} \quad \text{[Expression 15]}$$

Here, $S2'_R(\lambda)$, $S2'_G(\lambda)$ and $S2'_B(\lambda)$ denote spectral characteristics of the R signal, G signal and B signal to be processed after matrix conversion.

The target spectral characteristics $S1_R(\lambda)$, $S1_G(\lambda)$ and $S2'_B(\lambda)$ and spectral characteristics $S2'_R(\lambda)$, $S2'_G(\lambda)$ and $S2'_B(\lambda)$ after matrix conversion are transferred to the difference calculation section 200.

The difference calculation section 200 calculates averages $diff'_R$, $diff'_G$ and $diff'_B$ of absolute values of difference per wavelength between spectral characteristics regarding the R signal, G signal and B signal respectively based on the target spectral characteristics $S1_R(\lambda)$, $S1_G(\lambda)$ and $S1_B(\lambda)$ obtained via the matrix conversion section 203 and spectral characteristics $S2'_R(\lambda)$, $S2'_G(\lambda)$ and $S2'_B(\lambda)$ to be processed after matrix conversion using following Expression 16.

$$diff'_R = \frac{1}{N} \sum_\lambda |S1_R(\lambda) - S2'_R(\lambda)| \quad \text{[Expression 16]}$$

$$diff'_G = \frac{1}{N} \sum_\lambda |S1_G(\lambda) - S2'_G(\lambda)|$$

-continued $$diff'_B = \frac{1}{N} \sum_\lambda |S1_B(\lambda) - S2'_B(\lambda)|$$

The averages $diff'_R$, $diff'_G$ and $diff'_B$ calculated by the difference calculation section 200 are transferred to a maximum extraction section 201.

The maximum extraction section 201 calculates a spectral difference value diff' based on the above averages $diff'_R$, $diff'_G$ and $diff'_B$ regarding the respective color signals obtained via the difference calculation section 200 using following Expression 17.

$$diff' = \max(diff'_R, diff'_G, diff'_B) \quad \text{[Expression 17]}$$

The calculated spectral difference value diff' is transferred to a processing determining section 102.

The processing hereinafter is similar to the processing explained with reference to FIG. 5 or the like of aforementioned Embodiment 1.

Embodiment 2 provides effects substantially the same as those of above Embodiment 1, calculates the difference in spectral characteristics between first spectral characteristics after matrix conversion and second spectral characteristics, and can thereby more accurately determine whether or not the relationship between the first spectral characteristics and the second spectral characteristics is a linear relationship and consequently determine the color conversion processing appropriately depending on the condition as to whether or not the spectral characteristics are in a linear relationship.

[Embodiment 3]

Figure 13:
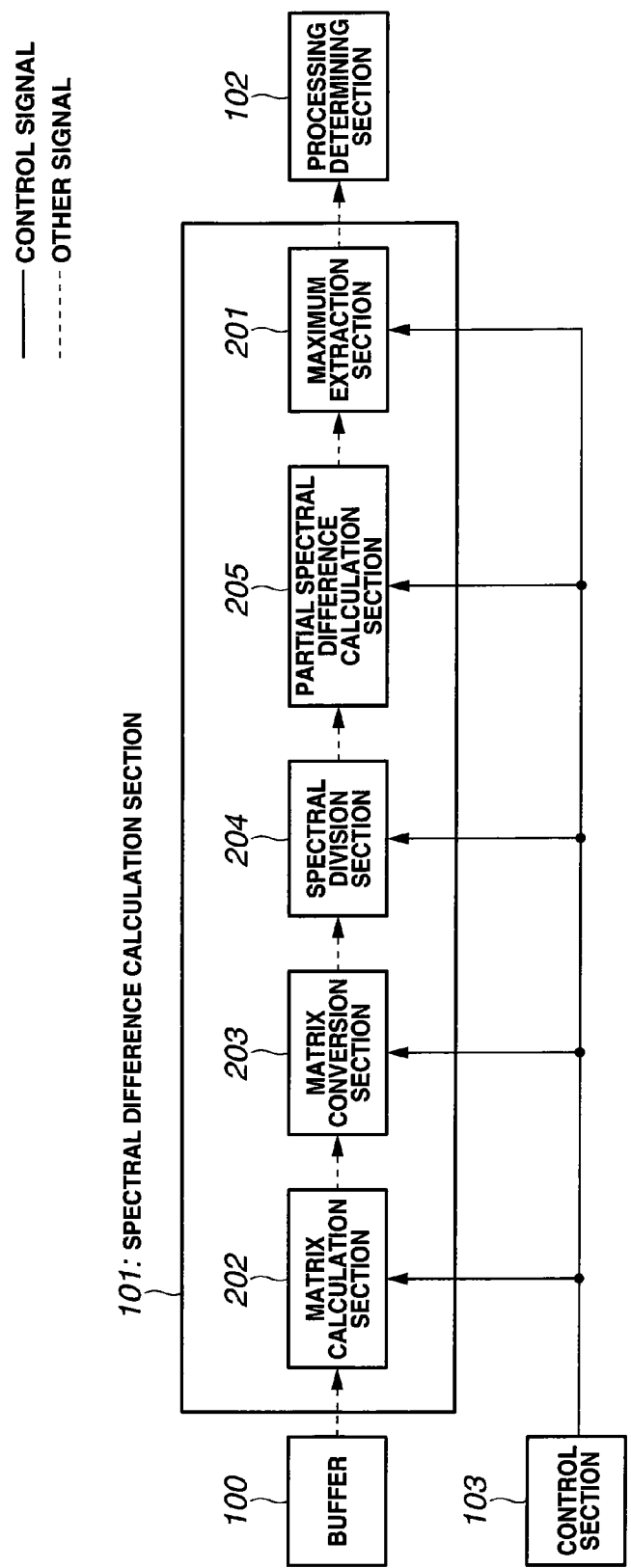
FIG. 13 is a block diagram showing a configuration of a spectral difference calculation section according to Embodiment 3 of the present invention.
Figure 17:
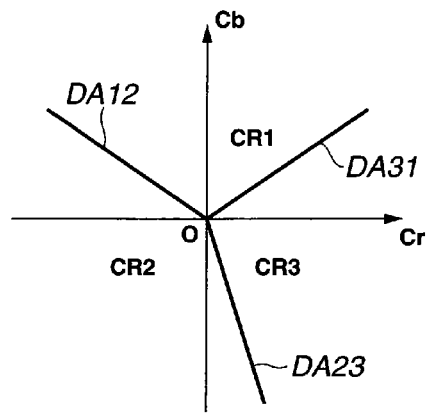
FIG. 17 is a diagram showing a color region corresponding to a partial wavelength range on a CrCb plane according to Embodiment 3.
Figure 18:
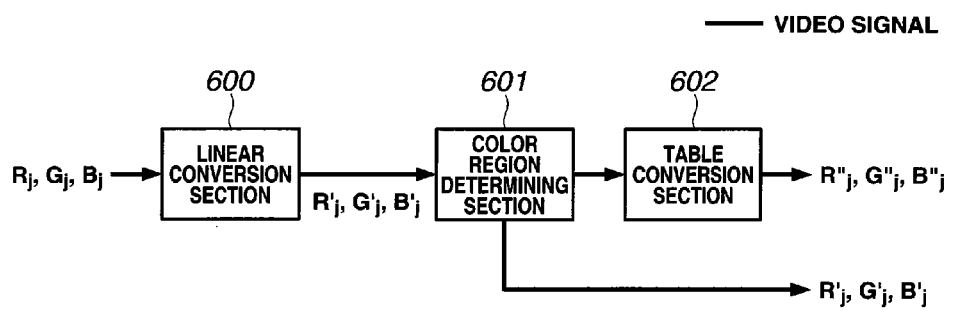
FIG. 18 is a block diagram showing an example where a combination of a linear conversion section and a table conversion section is used as color converting means according to Embodiment 3.
Figure 19:
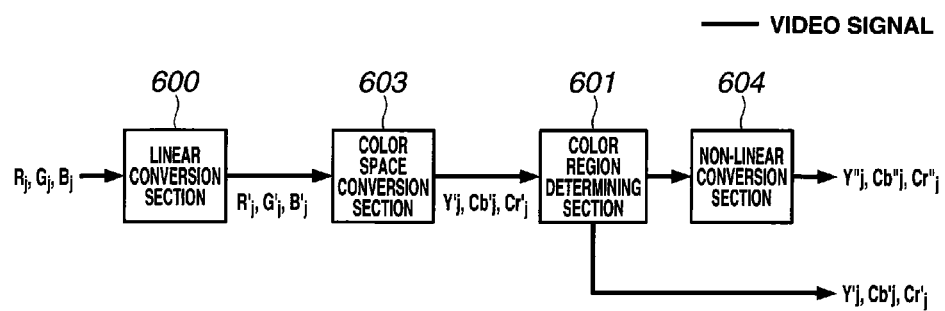
FIG. 19 is a block diagram showing an example where a combination of a linear conversion section and a non-linear conversion section is used as the color converting means according to Embodiment 3.

FIG. 13 to FIG. 19 illustrate Embodiment 3 of the present invention, FIG. 13 is a block diagram showing a configuration of a spectral difference calculation section; FIG. 14 is a diagram illustrating a difference between target spectral characteristics and spectral characteristics to be processed per partial wavelength range regarding an R signal; FIG. 15 is a diagram illustrating a difference between target spectral characteristics and spectral characteristics to be processed per partial wavelength range regarding a G signal; FIG. 16 is a diagram illustrating a difference between target spectral characteristics and spectral characteristics to be processed per partial wavelength range regarding a B signal; FIG. 17 is a diagram showing a color region corresponding to a partial wavelength range on a CrCb plane; FIG. 18 is a block diagram showing an example where a combination of a linear conversion section and a table conversion section is used as color converting means; and FIG. 19 is a block diagram showing an example where a combination of a linear conversion section and a non-linear conversion section is used as color converting means.

In Embodiment 3, parts similar to those in Embodiments 1 and 2 will be assigned the same reference numerals and explanations thereof will be omitted and only differences will be mainly explained.

A case has been explained in above Embodiment 2 where spectral difference values are calculated by taking the average of absolute values of a difference per wavelength between the two spectral characteristics and the sum in this case is calculated over the entire visible light region, whereas the present embodiment divides the visible light region into several partial wavelength ranges and calculates the sum for each partial wavelength range.

A spectral difference calculation section 101 of the present embodiment shown in FIG. 13 has a configuration corresponding to the configuration of the spectral difference calculation section 101 shown in FIG. 12 with the difference calculation section 200 omitted, and a spectral division section 204 which is a spectral dividing section and a partial spectral difference calculation section 205 which is the difference value calculating section added. The rest of the configuration of the signal processing apparatus of the present embodiment is similar to that of above described Embodiment 2.

As shown in FIG. 13, the matrix conversion section 203 is connected to the spectral division section 204. The spectral division section 204 is connected to the partial spectral difference calculation section 205. The partial spectral difference calculation section 205 is connected to the maximum extraction section 201. The control section 103 is bidirectionally connected with the spectral division section 204 and the partial spectral difference calculation section 205 so as to control these sections.

Next, only differences between operations of the signal processing apparatus of the present embodiment and those of Embodiments 1 and 2 will be explained.

What is inputted to this signal processing apparatus via the external I/F section 104 of the present embodiment are spectral characteristics of the target image pickup device of color reproduction, spectral characteristics of the image pickup device to be processed and a wavelength value serving as a reference for dividing the above described spectral characteristics into a plurality of partial wavelength ranges CR1, CR2 and CR3.

The spectral characteristics and wavelength values inputted via the external I/F section 104 are transferred to the buffer 100 via the control section 103 and saved therein.

The spectral characteristics and wavelength values saved in the buffer 100 are then transferred to the spectral difference calculation section 101.

First, the matrix calculation section 202 and the matrix conversion section 203 of the spectral difference calculation section 101 perform processing similar to that of above described Embodiment 2.

Next, the spectral division section 204 divides spectral characteristics in a range of 380 nm to 780 nm into three partial wavelength ranges CR1, CR2 and CR3 as shown in FIG. 14 to FIG. 16 based on the above described wavelength value serving as a reference obtained via the control section 103. When the above described wavelength value serving as a reference is inputted as numerical values 500 and 620 of wavelength expressed in nanometer units, that is, indicating 500 nm and 620 nm, the divided three partial wavelength ranges CR1, CR2 and CR3 become 380 nm to 500 nm, 500 nm to 620 nm and 620 nm to 780 nm respectively.

The partial spectral difference calculation section 205 calculates an average of absolute values of a difference per wavelength between the spectral characteristics of each color signal of the partial wavelength ranges CR1, CR2 and CR3 independently of each other.

That is, the partial spectral difference calculation section 205 calculates averages diff1'$_R$, diff1'$_G$ and diff1'$_B$ of absolute values of differences per wavelength between the spectral characteristics regarding the R signal, G signal and B signal in the partial wavelength range CR1 respectively as shown in following Expression 18.

$$diff1'_R = \frac{1}{N_1} \sum_{\lambda \in CR1} |S1_R(\lambda) - S2'_R(\lambda)| \qquad \text{[Expression 18]}$$

$$diff1'_G = \frac{1}{N_1} \sum_{\lambda \in CR1} |S1_G(\lambda) - S2'_G(\lambda)|$$

$$diff1'_B = \frac{1}{N_1} \sum_{\lambda \in CR1} |S1_B(\lambda) - S2'_B(\lambda)|$$

Here, $N_1$ in Expression 18 denotes a total sampling number in the wavelength direction of the partial wavelength range CR1 of the spectral characteristics. Furthermore, symbol "$\lambda \in CR1$" marked below symbol "$\Sigma$" means that the sum is taken with respect to wavelength $\lambda$ within the partial wavelength range CR1.

Furthermore, the partial spectral difference calculation section 205 calculates averages diff2'$_R$, diff2'$_G$, and diff2'$_B$ of absolute values of differences per wavelength between the spectral characteristics regarding the R signal, G signal and B signal within the partial wavelength range CR2 respectively as shown in following Expression 19.

$$diff2'_R = \frac{1}{N_2} \sum_{\lambda \in CR2} |S1_R(\lambda) - S2'_R(\lambda)| \qquad \text{[Expression 19]}$$

$$diff2'_G = \frac{1}{N_2} \sum_{\lambda \in CR2} |S1_G(\lambda) - S2'_G(\lambda)|$$

$$diff2'_B = \frac{1}{N_2} \sum_{\lambda \in CR2} |S1_B(\lambda) - S2'_B(\lambda)|$$

Here, $N_2$ in Expression 19 denotes a total sampling number in the wavelength direction of the partial wavelength range CR2 of the spectral characteristics. Furthermore, symbol "$\lambda \in CR2$" marked below symbol "$\Sigma$" means that the sum is taken with respect to wavelength $\lambda$ within the partial wavelength range CR2.

Furthermore, the partial spectral difference calculation section 205 calculates averages diff3'$_R$, diff3'$_G$, and diff3'$_B$ of absolute values of differences per wavelength between the spectral characteristics regarding the R signal, G signal and B signal within the partial wavelength range CR3 respectively as shown in following Expression 20.

$$diff3'_R = \frac{1}{N_3} \sum_{\lambda \in CR3} |S1_R(\lambda) - S2'_R(\lambda)| \qquad \text{[Expression 20]}$$

$$diff3'_G = \frac{1}{N_3} \sum_{\lambda \in CR3} |S1_G(\lambda) - S2'_G(\lambda)|$$

$$diff3'_B = \frac{1}{N_3} \sum_{\lambda \in CR3} |S1_B(\lambda) - S2'_B(\lambda)|$$

Here, $N_3$ in Expression 20 denotes a total sampling number in the wavelength direction of the partial wavelength range CR3 of the spectral characteristics. Furthermore, symbol "$\lambda \in CR3$" marked below symbol "$\Sigma$" means that the sum is taken with respect to wavelength $\lambda$ within the partial wavelength range CR3.

Thus, the averages diff1'$_R$, diff1'$_G$, diff1'$_B$, diff2'$_R$, diff2'$_G$, diff2'$_B$, diff3'$_R$, diff3'$_G$ and diff3'$_B$ calculated for each of the partial wavelength ranges CR1, CR2 and CR3 regarding each color signal are transferred to the maximum extraction section 201.

The maximum extraction section 201 calculates spectral difference values diff1', diff2' and diff3' for each of the partial wavelength ranges CR1, CR2 and CR3 as shown in following Expression 21.

diff1'=max(diff1'$_R$,diff1'$_G$,diff1'$_B$)

diff2'=max(diff2'$_R$,diff2'$_G$,diff2'$_B$)

diff3'=max(diff3'$_R$,diff3'$_G$,diff3'$_B$)     [Expression 21]

The spectral difference values diff1', diff2' and diff3' calculated by the maximum extraction section 201 are transferred to the processing determining section 102.

The comparison section 300 in the processing determining section 102 calculates flag signals flag1, flag2 and flag3 within the respective partial wavelength ranges CR1, CR2 and CR3 as shown in following Expression 22 based on diff1', diff2' and diff3' obtained from the above described maximum extraction section 201.

$$flag1 = \begin{cases} 0 & (diff1' \le refval) \\ 1 & (diff1' > refval) \end{cases}$$

$$flag2 = \begin{cases} 0 & (diff2' \le refval) \\ 1 & (diff2' > refval) \end{cases}$$

$$flag3 = \begin{cases} 0 & (diff3' \le refval) \\ 1 & (diff3' > refval) \end{cases}$$

[Expression 22]

The flag signals flag1, flag2 and flag3 calculated by the comparison section 300 are transferred to the converting means determining section 301.

The converting means determining section 301 is designed to determine the color conversion processing according to the combination of flag1, flag2 and flag3. For example, when all flag1, flag2 and flag3 are 0, the converting means determining section 301 determines the color conversion processing so as to apply only linear conversion to the entire color signal. On the other hand, when at least one of flag1, flag2 and flag3 is 0, the converting means determining section 301 applies linear conversion to the entire color signal first and then determines the color conversion processing so as to apply any one of conversion by non-linear calculation and table conversion to color signals within a color region to which colors corresponding to the partial wavelength ranges CR1, CR2 and CR3 where the flag signal becomes 1 out of the color signals after linear conversion.

Here, FIG. 17 conceptually illustrates the color regions CR1, CR2 and CR3 in a color space corresponding to the partial wavelength ranges CR1, CR2 and CR3 shown in FIG. 14 to FIG. 16. The present embodiment defines the color regions CR1, CR2 and CR3 corresponding to the partial wavelength ranges CR1, CR2 and CR3 on the planes formed by a Cb axis and a Cr axis in the YCbCr color space. In FIG. 17, the division axis DA12 indicates a boundary between the color region CR1 and the color region CR2, the division axis DA23 indicates a boundary between the color region CR2 and the color region CR3 and the division axis DA31 indicates a boundary between the color region CR3 and the color regions CR1.

Suppose the flag signal flag 1 regarding the partial wavelength range CR1 shown, for example, in FIG. 14 to FIG. 16 is 1. In this case, linear conversion is applied to the entire color signal first and then any one of conversion by non-linear calculation and table conversion is applied to the color signal belonging to the color region CR1 shown in FIG. 17 in the color signal after the linear conversion.

Here, the color converting means will be explained with reference to FIG. 18 and FIG. 19.

First, FIG. 18 shows a configuration example of the color converting means combining the linear conversion section and the table conversion section.

The color converting means shown in FIG. 18 is configured by including a linear conversion section 600 which is color converting means and the linear converting section, a color region determining section 601 which is color region determining means and a table conversion section 602 which is color converting means and the non-linear converting section.

In such a configuration, when an $R_j$, $G_j$, $B_j$ signal is inputted to the linear conversion section 600, the matrix conversion shown in Expression 12 is performed as linear conversion and an $R'_j$, $G'_j$, $B'_j$ signal after matrix conversion is generated. This $R'_j$, $G'_j$, $B'_j$ signal is transferred to the color region determining section 601.

The color region determining section 601 determines whether or not the inputted $R'_j$, $G'_j$, $B'_j$ signal after the matrix conversion belongs to a predetermined color region where the flag signal is 1 and upon determining that the $R'_j$, $G'_j$, $B'_j$ signal does not belong to the predetermined color region, the color region determining section 601 outputs the $R'_j$, $G'_j$, $B'_j$ signal as is without using the table conversion section 602. On the other hand, upon determining that the inputted $R'_j$, $G'_j$, $B'_j$ signal belongs to the predetermined color region where the flag signal becomes 1, the color region determining section 601 transfers the $R'_j$, $G'_j$, $B'_j$ signal to the table conversion section 602.

The table conversion section 602 looks up a predetermined table and thereby outputs an $R''_j$, $G''_j$, $B''_j$ signal corresponding to the inputted $R'_j$, $G'_j$, $B'_j$ signal.

Next, FIG. 19 shows a configuration example of the color converting means combining the linear conversion section and the non-linear conversion section.

The color converting means shown in FIG. 19 is configured by including a linear conversion section 600, a color space conversion section 603 which is a color space converting section, a color region determining section 601 and a non-linear conversion section 604 which is color converting means and the non-linear converting section.

In such a configuration, when an $R_j$, $G_j$, $B_j$ signal is inputted to the linear conversion section 600, the matrix conversion as shown in Expression 12 is performed as linear conversion and an $R'_j$, $G'_j$, $B'_j$ signal after the matrix conversion is generated. This $R'_j$, $G'_j$, $B'_j$ signal is transferred to the color space conversion section 603.

The color space conversion section 603 performs color space conversion processing, for example, an $R'_j$, $G'_j$, $B'_j$ signal into a signal in a Y, Cb, Cr color space, for the inputted $R'_j$, $G'_j$, $B'_j$ signal after the matrix conversion in the present embodiment and generates a brightness color difference signal $Y'_j$, $Cb'_j$, $Cr'_j$ signal. This $Y'_j$, $Cb'_j$, $Cr'_j$ signal is transferred to the color region determining section 601.

The color region determining section 601 determines whether or not the inputted $Y'_j$, $Cb'_j$, $Cr'_j$ signal belongs to a predetermined color region where the flag signal is 1 and outputs the $Y'_j$, $Cb'_j$, $Cr'_j$ signal upon determining that the inputted $Y'_j$, $Cb'_j$, $Cr'_j$ signal does not belong to the predetermined color region without using the non-linear conversion section 604.

Furthermore, upon determining that the inputted $Y'_j$, $Cb'_j$, $Cr'_j$ signal belongs to a predetermined color region where the flag signal is 1, the color region determining section 601 transfers the $Y'_j$, $Cb'_j$, $Cr'_j$ signal to the non-linear conversion section 604.

The non-linear conversion section 604 performs processing of color conversion calculation on the inputted $Y'_j$, $Cb'_j$, $Cr'_j$ signal using, for example, a quadratic function shown in following Expression 23 and generates a $Y''_j$, $Cb''_j$, $Cr''_j$ signal.

$$Y''_j = q \cdot Y'^2_j + r \cdot Cb'^2_j + s \cdot Cr'^2_j$$

$$Cb''_j = t \cdot Y'^2_j + u \cdot Cb'^2_j + v \cdot Cr'^2_j$$

$$Cr''_j = w \cdot Y'^2_j + x \cdot Cb'^2_j + y \cdot Cr'^2_j$$

[Expression 23]

Furthermore, q to y denote predetermined coefficients used for non-linear calculations. These coefficients q to y are calculated using a least squares method or the like as in the case of the coefficients b to m in aforementioned Expression 13 so that the error in numerical values between the color signal outputted from the target image pickup device of color reproduction and the color signal obtained by applying the color conversion processing in aforementioned Expression 23 to the color signal outputted from the image pickup device to be processed becomes a minimum.

Such Embodiment 3 provides substantially the same effects as those in aforementioned Embodiments 1 and 2, divides the spectral characteristics of a target image pickup device of color reproduction and spectral characteristics of an image pickup device to be processed into a plurality of partial wavelength ranges respectively, calculates the difference between the spectral characteristics for each partial wavelength range and determines the appropriate color conversion processing for each partial wavelength range based on this difference, and can thereby perform appropriate color conversion corresponding to each color.

[Notes]

[First Aspect of Present Invention]

A signal processing apparatus according to a first aspect is a signal processing apparatus for determining a color conversion processing for color-converting a second color signal obtained through image pickup by a second image pickup device to be processed to a color signal approximate to a first color signal obtained through image pickup by a target first image pickup device, including a difference calculating section for calculating a spectral difference value indicating a difference between spectral characteristics of the first image pickup device and spectral characteristics of the second image pickup device and a processing determining section for determining linear conversion as the color conversion processing when the spectral difference value is equal to or less than a determination reference value and determining non-linear conversion as the color conversion processing when the spectral difference value is greater than the determination reference value.

(Embodiments and Preferred Examples of Application of Corresponding Invention)

Embodiments 1 to 3 correspond to this aspect. The spectral difference calculation section 101 shown in FIG. 1 corresponds to the difference calculating section and the processing determining section 102 shown in FIG. 1 corresponds to the processing determining section respectively.

A preferred example of application of this aspect is a signal processing apparatus that calculates a spectral difference value indicating a difference between spectral characteristics of a first image pickup device and spectral characteristics of a second image pickup device, determines, when the spectral difference value is equal to or less than a determination reference value, linear conversion as the color conversion processing and determines, when the spectral difference value is greater than the determination reference value, non-linear conversion as the color conversion processing.

(Operation)

A difference between two spectral characteristics is calculated and the color conversion processing is determined according to the magnitude of difference in the calculated spectral characteristics.

(Effect)

When the spectral difference value is equal to or less than the determination reference value, linear conversion is determined as the color conversion processing, and therefore color reproduction with necessary accuracy can be realized at low cost. Furthermore, when the spectral difference value is greater than the determination reference value, non-linear conversion is determined as the color conversion processing, and therefore color reproduction with high accuracy is possible. Thus, color conversion processing with high accuracy according to the difference in spectral characteristics can be realized at appropriate cost.

(Second Aspect of Present Invention)

Furthermore, a signal processing apparatus according to a second aspect is a signal processing apparatus according to the first aspect, wherein the first color signal and the second color signal are made up of a plurality of color signals, the difference calculating section calculates a difference between the spectral characteristics of the first image pickup device and the spectral characteristics of the second image pickup device for each of spectral characteristics corresponding to the plurality of color signals and calculates the spectral difference value based on the plurality of differences.

(Embodiments and Preferred Examples of Application of Corresponding Invention)

Embodiments 1 to 3 correspond to this aspect.

A preferred example of application of this aspect is a signal processing apparatus that calculates a difference between spectral characteristics of a first image pickup device and spectral characteristics of a second image pickup device for each of spectral characteristics corresponding to the plurality of color signals and calculates a spectral difference value based on the plurality of differences.

(Operation))

A spectral difference value is calculated for each of spectral characteristics corresponding to a plurality of color signals.

(Effect)

Since a difference is calculated for each of spectral characteristics corresponding to a plurality of color signals, the color conversion processing can be determined with higher accuracy.

(Third Aspect of Present Invention)

Furthermore, a signal processing apparatus according to a third aspect is a signal processing apparatus according to the second aspect, wherein the difference calculating section is configured by including a difference value calculating section for calculating an average of absolute values of a difference per wavelength between spectral characteristics of the first image pickup device and the second image pickup device for one of the plurality of color signals, in correspondence with each of the plurality of color signals, and a maximum extracting section for extracting a maximum value from among the plurality of averages calculated by the difference value calculating section and using the extracted maximum value as the spectral difference value.

(Embodiments and Preferred Examples of Application of Corresponding Invention)

Embodiments 1 to 3 correspond to this aspect. The difference calculation section 200 shown in FIG. 5 and FIG. 12 and the partial spectral difference calculation section 205 shown in FIG. 13 correspond to the difference value calculating section, and the maximum extraction section 201 shown in FIG. 5, FIG. 12 and FIG. 13 corresponds to the maximum extracting section.

A preferred example of application of this aspect is a signal processing apparatus that calculates an average of absolute values of a difference per wavelength between spectral characteristics of a first image pickup device corresponding to one of a plurality of color signals and spectral characteristics of a second image pickup device in correspondence with each of the plurality of color signals and uses a maximum value extracted from the plurality of calculated averages as a spectral difference value.

(Operation)

An average of absolute values of a difference per wavelength between spectral characteristics of the first image pickup device and spectral characteristics of the second image pickup device is calculated in correspondence with each of a plurality of color signals and a maximum value thereof is used as a spectral difference value.

(Effect)

Since processing of calculating a difference, processing of calculating an absolute value and processing of calculating an average are easily implemented, it is possible to calculate a spectral difference value at low cost.

(Fourth Aspect of Present Invention)

A signal processing apparatus according to a fourth aspect is a signal processing apparatus according to the third aspect, wherein the difference calculating section further includes a matrix calculating section for calculating a matrix that minimizes a difference for each of the plurality of color signals based on spectral characteristics of the first image pickup device and spectral characteristics of the second image pickup device and a matrix converting section for converting spectral characteristics of the second image pickup device based on the matrix calculated by the matrix calculating section, and the difference value calculating section calculates an average of absolute values of a difference per wavelength between spectral characteristics of the first image pickup device and spectral characteristics of the second image pickup device after conversion obtained from the matrix converting section for one of the plurality of color signals, in correspondence with each of the plurality of color signals.

(Embodiments and Preferred Examples of Application of Corresponding Invention)

Embodiments 2 and 3 correspond to this aspect. The matrix calculation section 202 shown in FIG. 12 and FIG. 13 corresponds to the matrix calculating section and the matrix conversion section 203 shown in FIG. 12 and FIG. 13 corresponds to the matrix converting section.

A preferred example of application of this aspect is a signal processing apparatus that calculates a matrix that minimizes a difference for each of a plurality of color signals based on spectral characteristics of the first image pickup device and spectral characteristics of the second image pickup device, converts spectral characteristics of the second image pickup device based on the calculated matrix, and calculates an average of absolute values of a difference per wavelength between spectral characteristics of the first image pickup device corresponding to one of a plurality of color signals and spectral characteristics of the second image pickup device after matrix conversion in correspondence with each of the plurality of color signals.

(Operation)

A matrix that minimizes a difference in spectral characteristics is calculated, spectral characteristics of the second image pickup device is converted based on the calculated matrix, and an average of absolute values of a difference per wavelength between spectral characteristics of the second image pickup device after conversion and spectral characteristics of the first image pickup device is calculated in correspondence with each of the plurality of color signals.

(Effect)

Since a difference in spectral characteristics is calculated between spectral characteristics of the first image pickup device and spectral characteristics of the second image pickup device, it is possible to accurately determine the degree of linearity of the relationship between spectral characteristics of the first image pickup device and spectral characteristics of the second image pickup device and more appropriately determine the color conversion processing according to the degree of linearity.

(Fifth Aspect of Present Invention)

A signal processing apparatus according to a fifth aspect is a signal processing apparatus according to the third aspect, wherein the difference calculating section is configured by further including a spectral dividing section for dividing spectral characteristics of the first image pickup device and spectral characteristics of the second image pickup device into a plurality of partial wavelength ranges, the difference value calculating section calculates, for each of the partial wavelength ranges, the average of absolute values of a difference per wavelength between spectral characteristics of the first image pickup device and the second image pickup device for one of the plurality of color signals, in correspondence with each of the plurality of color signals, the maximum extracting section extracts the maximum value from among a plurality of averages calculated by the difference value calculating section for each of the partial wavelength ranges and uses the extracted maximum value as the spectral difference value, and the processing determining section determines, for each of the partial wavelength ranges, linear conversion as the color conversion processing when the spectral difference value in each of the partial wavelength ranges is equal to or less than the determination reference value, and determines non-linear conversion as the color conversion processing when the spectral difference value is greater than the determination reference value.

(Embodiments and Preferred Examples of Application of Corresponding Invention)

Embodiment 3 corresponds to this aspect. The spectral division section 204 shown in FIG. 13 corresponds to the spectral dividing section.

A preferred example of application of this aspect is a signal processing apparatus that divides spectral characteristics of a first image pickup device and spectral characteristics of a second image pickup device into a plurality of partial wavelength ranges, calculates an average of absolute values of a difference per wavelength between spectral characteristics of the first image pickup device and spectral characteristics of the second image pickup device corresponding to one of a plurality of color signals for each partial wavelength range in correspondence with each of the plurality of color signals, uses a maximum value extracted from a plurality of averages for each partial wavelength range as a spectral difference value, determines, when the spectral difference value is equal to or less than a determination reference value for each partial wavelength range, linear conversion as the color conversion processing and determines, when the spectral difference value is greater than the determination reference value, non-linear conversion as the color conversion processing.

(Operation)

The two spectral characteristics are divided into a plurality of partial wavelength ranges, an average of absolute values of a difference per wavelength between the two spectral characteristics is calculated in correspondence with each of a plurality of color signals for each partial wavelength range, a maximum value extracted from a plurality of averages is used as a spectral difference value for each partial wavelength range and the color conversion processing is determined for each partial wavelength range based on the spectral difference value.

(Effect)

Since the color conversion processing is determined for each partial wavelength range, it is possible to determine the color conversion processing suitable for each color.

(Sixth Aspect of Present Invention)

A signal processing apparatus according to a sixth aspect is a signal processing apparatus according to the fifth aspect, further including a color space converting section for converting the second color signal to a signal of a predetermined color space, a color region determining section for determining whether the signal of the color space belongs to the color region of the color space corresponding to a partial wavelength range where linear conversion is determined by the processing determining section or belongs to the color region of the color space corresponding to a partial wavelength range where non-linear conversion is determined by the processing determining section, a linear converting section for performing linear conversion on a signal determined to belong to the color region of the color space corresponding to the partial wavelength range where the linear conversion is determined by the color region determining section and a non-linear converting section for performing non-linear conversion on a signal determined to belong to the color region of the color space corresponding to the partial wavelength range where the non-linear conversion is determined by the color region determining section.

(Embodiments and Preferred Examples of Application of Corresponding Invention)

Embodiment 3 corresponds to this aspect. The color space conversion section 603 shown in FIG. 19 corresponds to the color space converting section, the color region determining section 601 shown in FIG. 19 corresponds to the color region determining section, the linear conversion section 600 shown in FIG. 19 corresponds to the linear converting section and the non-linear conversion section 604 shown in FIG. 19 corresponds to the non-linear converting section.

A preferred example of application of this aspect is a signal processing apparatus that converts a second color signal to a signal of predetermined color space and performs linear conversion or non-linear conversion according to the color region to which the signal of the color space belongs.

(Operation)

A second color signal is converted to a signal of a predetermined color space and linear conversion or non-linear conversion is performed according to the color region to which the signal of the color space belongs.

(Effect)

Performing linear conversion or non-linear conversion according to the color region allows the color conversion processing with high accuracy to be performed.

(Seventh Aspect of Present Invention)

A signal processing apparatus according to a seventh aspect is the signal processing apparatus according to the first aspect, wherein the linear conversion includes conversion through a matrix calculation, the non-linear conversion includes at least one of conversion through a non-linear calculation, a table, a combination of a matrix calculation and a non-linear calculation and a combination of a matrix calculation and a table.

(Embodiments and Preferred Examples of Application of Corresponding Invention)

Embodiments 1 to 3 correspond to this aspect. A conversion through a matrix calculation is performed by the linear conversion section 500 shown in FIG. 8 and the linear conversion section 600 shown in FIG. 18 and FIG. 19, a conversion through a non-linear calculation is performed by the non-linear conversion section 510 shown in FIG. 9, a conversion through a table is performed by the table conversion section 520 shown in FIG. 10, a combination of conversion through a matrix calculation and conversion through a non-linear calculation is performed by a combination of the linear conversion section 600 and non-linear conversion section 604 shown in FIG. 19, and a combination of conversion through a matrix calculation and conversion through a table is performed by a combination of the linear conversion section 600 and the table conversion section 602 shown in FIG. 18.

A preferred example of application of this aspect is a signal processing apparatus that determines conversion through a matrix calculation as linear conversion and determines any one of conversion through a non-linear calculation, conversion through a table, a combination of conversion through a matrix calculation and conversion through a non-linear calculation and a combination of conversion through a matrix calculation and conversion through a table as non-linear conversion.

(Operation)

Conversion through a matrix calculation is determined as linear conversion, and one of conversion through a non-linear calculation, conversion through a table, a combination of conversion through a matrix calculation and conversion through a non-linear calculation and a combination of conversion through a matrix calculation and conversion through a table is determined as non-linear conversion.

(Effect)

Conversion through a matrix calculation is easily implemented, and it is therefore possible to construct a high-speed and low-cost system. Furthermore, when conversion through a matrix calculation and conversion through a table are used, the color conversion processing with high accuracy can be performed. As a result, high-definition video signal is obtained. Making full use of such a characteristic of color conversion through linear conversion and characteristic of color conversion through non-linear conversion allows the color conversion processing to be realized at low cost and with high accuracy.

(Eighth Aspect of Present Invention)

A signal processing apparatus according to an eighth aspect is the signal processing apparatus according to the first aspect, wherein the non-linear conversion includes conversion through a plurality of tables differing in size, the processing determining section further compares, when the spectral difference value is greater than the determination reference value, the spectral difference value with a second determination reference value greater than the determination reference value and determines, when the spectral difference value is greater than the second determination reference value, the color conversion processing to a conversion through a table having a greater table size than when the spectral difference value is equal to or less than the second determination reference value.

(Embodiments and Preferred Examples of Application of Corresponding Invention)

Embodiments 1 to 3 correspond to this aspect. Conversion through a plurality of tables of different sizes is carried out by the table conversion section 520 shown in FIG. 10 and the table conversion section 602 shown in FIG. 18.

A preferred example of application of this aspect is a signal processing apparatus that further compares, when the spectral difference value is greater than a determination reference value, the spectral difference value with a second determination reference value greater than the determination reference value and determines, when the spectral difference value is greater than the second determination reference value, the color conversion processing to a conversion through a table having a greater table size than when the spectral difference value is equal to or less than the second determination reference value.

(Operation)

When the spectral difference value is greater than the determination reference value, the spectral difference value is further compared with a second determination reference value and a table having a greater table size is determined when the spectral difference value is greater than the second determination reference value compared to when the spectral difference value is equal to or less than the second determination reference value.

(Effect)

Since a table having a greater table size is determined when the spectral difference value is greater and a table having a smaller table size is determined when the spectral difference value is smaller, it is possible to perform the necessary color conversion processing with high accuracy while reducing cost.

(Ninth Aspect of Present Invention)

A computer-readable recording medium for recording a signal processing program according to a ninth aspect is a recording medium for recording a signal processing program for determining a color conversion processing for color-converting a second color signal obtained through image pickup using a second image pickup device to be processed to a color signal approximate to a first color signal obtained through image pickup using a target first image pickup device, including a difference calculating step of calculating a spectral difference value indicating a difference between spectral characteristics of the first image pickup device and spectral characteristics of the second image pickup device and a processing determining step of determining, when the spectral difference value is equal to or less than a determination reference value, linear conversion as the color conversion processing and determining, when the spectral difference value is greater than the determination reference value, non-linear conversion as the color conversion processing.

(Embodiments and Preferred Examples of Application of Corresponding Invention, Operation and Effect)

Substantially the same as those of the first aspect.

(Tenth Aspect of Present Invention)

A computer-readable recording medium for recording a signal processing program according to a tenth aspect is the computer-readable recording medium for recording a signal processing program according to the ninth aspect, wherein the first color signal and the second color signal are constructed of a plurality of color signals, and the difference calculating step is a step of calculating a difference between the spectral characteristics of the first image pickup device and the spectral characteristics of the second image pickup device for each of spectral characteristics corresponding to the plurality of color signals and calculating the spectral difference value based on the plurality of differences.

(Embodiments and Preferred Examples of Application of Corresponding Invention, Operation and Effect)

Substantially the same as those of the second aspect.

(Eleventh Aspect of Present Invention)

A computer-readable recording medium for recording a signal processing program according to an eleventh aspect is the computer-readable recording medium for recording a signal processing program according to the tenth aspect, wherein the difference calculating step includes a difference value calculating step of calculating an average of absolute values of a difference per wavelength between spectral characteristics of the first image pickup device and the second image pickup device for one of the plurality of color signals, in correspondence with each of the plurality of color signals and a maximum extracting step of extracting a maximum value from among the plurality of averages calculated in the difference value calculating step and using the extracted maximum value as the spectral difference value.

(Embodiments and Preferred Examples of Application of Corresponding Invention, Operation and Effect)

Substantially the same as those of the third aspect.

(Twelfth Aspect of Present Invention)

A computer-readable recording medium for recording a signal processing program according to a twelfth aspect is the computer-readable recording medium for recording a signal processing program according to the eleventh aspect, wherein the difference calculating step further includes a matrix calculating step of calculating a matrix that minimizes a difference for each of the plurality of color signals based on spectral characteristics of the first image pickup device and spectral characteristics of the second image pickup device and a matrix converting step of converting spectral characteristics of the second image pickup device based on the matrix calculated in the matrix calculating step, and the difference value calculating step is a step of calculating an average of absolute values of a difference per wavelength between spectral characteristics of the first image pickup device and spectral characteristics of the second image pickup device after conversion obtained in the matrix converting step for one of the plurality of color signals, in correspondence with each of the plurality of color signals.

(Embodiments and Preferred Examples of Application of Corresponding Invention, Operation and Effect)

Substantially the same as those of the fourth aspect.

(Thirteenth Aspect of Present Invention)

A computer-readable recording medium for recording a signal processing program according to a thirteenth aspect is the computer-readable recording medium for recording a signal processing program according to the eleventh aspect, wherein the difference calculating step further includes a spectral dividing step of dividing spectral characteristics of the first image pickup device and spectral characteristics of the second image pickup device into a plurality of partial wavelength ranges, the difference value calculating step is a step of calculating, for each of the partial wavelength ranges, the average of absolute values of a difference per wavelength between spectral characteristics of the first image pickup device and the second image pickup device for one of the plurality of color signals, in correspondence with each of the plurality of color signals, the maximum extracting step is a step of extracting the maximum value from among a plurality of averages calculated in the difference value calculating step for each of the partial wavelength ranges and using the extracted maximum value as the spectral difference value, and the processing determining step is a step of determining, for each of the partial wavelength ranges, linear conversion as the color conversion processing when the spectral difference value is equal to or less than a determination reference value, and determining non-linear conversion as the color converting processing when the spectral difference value is greater than the determination reference value.

(Embodiments and Preferred Examples of Application of Corresponding Invention, Operation and Effect)

Substantially the same as those of the fifth aspect.

The present invention is not limited to the above described embodiments as they are, but can be embodied by modifying the components within a scope not departing from the spirit and/or scope of the present invention in the stage of execution. Furthermore, various types of invention can be formed through an appropriate combination of a plurality of components disclosed in the embodiments. For example, several components may be deleted from all the components illustrated in the embodiments. Furthermore, the components in different embodiments may be combined with each other as appropriate. Thus, it goes without saying that various modifications and applications are possible without departing from the spirit and/or scope of the present invention.

What is claimed is:

1. A signal processing apparatus for determining a color conversion processing for color-converting a second color signal obtained through image pickup by a second image pickup device to be processed to a color signal approximate to a first color signal obtained through image pickup by a target first image pickup device, comprising:

a difference calculating section for calculating a spectral difference value indicating a difference between spectral characteristics of the first image pickup device and spectral characteristics of the second image pickup device; and a processing determining section for determining linear conversion as the color conversion processing when the spectral difference value is equal to or less than a determination reference value and determining non-linear conversion as the color conversion processing when the spectral difference value is greater than the determination reference value.

2. The signal processing apparatus according to claim 1, wherein the first color signal and the second color signal are made up of a plurality of color signals, the difference calculating section calculates a difference between the spectral characteristics of the first image pickup device and the spectral characteristics of the second image pickup device for each of spectral characteristics corresponding to the plurality of color signals and calculates the spectral difference value based on the plurality of differences.

3. The signal processing apparatus according to claim 2, wherein the difference calculating section comprises:
a difference value calculating section for calculating an average of absolute values of a difference per wavelength between spectral characteristics of the first image pickup device and the second image pickup device for one of the plurality of color signals, in correspondence with each of the plurality of color signals; and
a maximum extracting section for extracting a maximum value from among the plurality of averages calculated by the difference value calculating section and using the extracted maximum value as the spectral difference value.

4. The signal processing apparatus according to claim 3, wherein the difference calculating section further comprises:
a matrix calculating section for calculating a matrix that minimizes a difference for each of the plurality of color signals based on spectral characteristics of the first image pickup device and spectral characteristics of the second image pickup device; and
a matrix converting section for converting spectral characteristics of the second image pickup device based on the matrix calculated by the matrix calculating section, and
the difference value calculating section calculates an average of absolute values of a difference per wavelength between spectral characteristics of the first image pickup device and spectral characteristics of the second image pickup device after conversion obtained from the matrix converting section for one of the plurality of color signals, in correspondence with each of the plurality of color signals.

5. The signal processing apparatus according to claim 3, wherein the difference calculating section further comprises a spectral dividing section for dividing spectral characteristics of the first image pickup device and spectral characteristics of the second image pickup device into a plurality of partial wavelength ranges,
the difference value calculating section calculates, for each of the partial wavelength ranges, the average of absolute values of a difference per wavelength between spectral characteristics of the first image pickup device and the second image pickup device for one of the plurality of color signals, in correspondence with each of the plurality of color signals,
the maximum extracting section extracts the maximum value from among a plurality of averages calculated by the difference value calculating section for each of the partial wavelength ranges and uses the extracted maximum value as the spectral difference value, and
the processing determining section determines, for each of the partial wavelength ranges, linear conversion as the color conversion processing when the spectral difference value in each of the partial wavelength ranges is equal to or less than the determination reference value, and determines non-linear conversion as the color conversion processing when the spectral difference value is greater than the determination reference value.

6. The signal processing apparatus according to claim 5, further comprising:
a color space converting section for converting the second color signal to a signal of a predetermined color space;
a color region determining section for determining whether the signal of the color space belongs to the color region of the color space corresponding to a partial wavelength range where linear conversion is determined by the processing determining section or belongs to the color region of the color space corresponding to a partial wavelength range where non-linear conversion is determined by the processing determining section;
a linear converting section for performing linear conversion on a signal determined to belong to the color region of the color space corresponding to the partial wavelength range where the linear conversion is determined by the color region determining section; and
a non-linear converting section for performing non-linear conversion on a signal determined to belong to the color region of the color space corresponding to the partial wavelength range where the non-linear conversion is determined by the color region determining section.

7. The signal processing apparatus according to claim 1, wherein the linear conversion comprises conversion through a matrix calculation, and
the non-linear conversion comprises at least one of conversion through a non-linear calculation, a table, a combination of a matrix calculation and a non-linear calculation and a combination of a matrix calculation and a table.

8. The signal processing apparatus according to claim 1, wherein the non-linear conversion comprises conversion through a plurality of tables differing in size, and
the processing determining section further compares, when the spectral difference value is greater than the determination reference value, the spectral difference value with a second determination reference value greater than the determination reference value and determines, when the spectral difference value is greater than the second determination reference value, the color conversion processing to a conversion through a table having a greater table size than when the spectral difference value is equal to or less than the second determination reference value.

9. A non-transitory computer-readable medium having encoded thereon a signal processing program comprising a set of instructions when executed by a computer to implement a method for determining a color conversion processing for color-converting a second color signal obtained through image pickup using a second image pickup device to be processed to a color signal approximate to a first color signal obtained through image pickup using a target first image pickup device, the method comprising:
a difference calculating step of calculating a spectral difference value indicating a difference between spectral characteristics of the first image pickup device and spectral characteristics of the second image pickup device; and
a processing determining step of determining, when the spectral difference value is equal to or less than a determination reference value, linear conversion as the color conversion processing and determining, when the spectral difference value is greater than the determination reference value, non-linear conversion as the color conversion processing.

10. The computer-readable recording medium for recording a signal processing program according to claim 9, wherein the first color signal and the second color signal comprise a plurality of color signals, and
the difference calculating step is a step of calculating a difference between the spectral characteristics of the first image pickup device and the spectral characteristics of the second image pickup device for each of spectral characteristics corresponding to the plurality of color signals and calculating the spectral difference value based on the plurality of differences.

11. The computer-readable recording medium for recording a signal processing program according to claim 10, wherein the difference calculating step comprises:
- a difference value calculating step of calculating an average of absolute values of a difference per wavelength between spectral characteristics of the first image pickup device and the second image pickup device for one of the plurality of color signals, in correspondence with each of the plurality of color signals; and
- a maximum extracting step of extracting a maximum value from among the plurality of averages calculated in the difference value calculating step and using the extracted maximum value as the spectral difference value.

12. The computer-readable recording medium for recording a signal processing program according to claim 11, wherein the difference calculating step further comprises:
- a matrix calculating step of calculating a matrix that minimizes a difference for each of the plurality of color signals based on spectral characteristics of the first image pickup device and spectral characteristics of the second image pickup device; and
- a matrix converting step of converting spectral characteristics of the second image pickup device based on the matrix calculated in the matrix calculating step, and
- the difference value calculating step is a step of calculating an average of absolute values of a difference per wavelength between spectral characteristics of the first image pickup device and spectral characteristics of the second image pickup device after conversion obtained in the matrix converting step for one of the plurality of color signals, in correspondence with each of the plurality of color signals.

13. The computer-readable recording medium for recording a signal processing program according to claim 11, wherein the difference calculating step further includes a spectral dividing step of dividing spectral characteristics of the first image pickup device and spectral characteristics of the second image pickup device into a plurality of partial wavelength ranges,
- the difference value calculating step is a step of calculating, for each of the partial wavelength ranges, the average of absolute values of a difference per wavelength between spectral characteristics of the first image pickup device and the second image pickup device for one of the plurality of color signals, in correspondence with each of the plurality of color signals,
- the maximum extracting step is a step of extracting the maximum value from among a plurality of averages calculated in the difference value calculating step for each of the partial wavelength ranges and using the extracted maximum value as the spectral difference value, and
- the processing determining step is a step of determining, for each of the partial wavelength ranges, linear conversion as the color conversion processing when the spectral difference value is equal to or less than a determination reference value, and determining non-linear conversion as the color conversion processing, when the spectral difference value is greater than the determination reference value.

* * * * *